(12) United States Patent
Canberk et al.

(10) Patent No.: US 11,935,421 B2
(45) Date of Patent: Mar. 19, 2024

(54) VIRTUAL TUTORIALS FOR MUSICAL INSTRUMENTS WITH FINGER TRACKING IN AUGMENTED REALITY

(71) Applicants: Ilteris Canberk, Marina Del Rey, CA (US); Dmytro Kucher, Odessa (UA)

(72) Inventors: Ilteris Canberk, Marina Del Rey, CA (US); Dmytro Kucher, Odessa (UA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/880,425

(22) Filed: Aug. 3, 2022

(65) Prior Publication Data
US 2022/0375362 A1 Nov. 24, 2022

Related U.S. Application Data

(63) Continuation of application No. 16/865,995, filed on May 4, 2020, now Pat. No. 11,798,429.

(51) Int. Cl.
*G09B 15/02* (2006.01)
*G06F 3/01* (2006.01)
(Continued)

(52) U.S. Cl.
CPC ............ *G09B 15/023* (2013.01); *G06F 3/011* (2013.01); *G06T 7/50* (2017.01); *G06T 7/70* (2017.01);
(Continued)

(58) Field of Classification Search
CPC .......... G09B 15/023; G06T 7/50; G06T 7/70; G06T 11/00; G06T 2200/24;
(Continued)

(56) References Cited

U.S. PATENT DOCUMENTS 8,799,821 B1 8/2014 Rose et al.
9,024,842 B1 5/2015 Gomez et al.
(Continued)

FOREIGN PATENT DOCUMENTS

CN 106199511 A 12/2016
EP 3116615 A1 1/2017
(Continued)

OTHER PUBLICATIONS

Cas and Chary VR: https://Avww. youtube.com/watch?v=_8VqOfrHG94 , viewed on Dec. 4, 2021, published online on Feb. 25, 2020 (Year: 2020).*

(Continued)

*Primary Examiner* — Jianchun Qin
(74) *Attorney, Agent, or Firm* — Culhane Meadows PLLC; Stephen J. Weed

(57) ABSTRACT

Systems, devices, media, and methods are described for presenting a tutorial in augmented reality on the display of a smart eyewear device. The system includes a marker registration utility for setting a marker on a musical instrument, a localization utility, a virtual object rendering utility for presenting virtual tutorial objects on the display near the instrument, and a hand tracking utility for tracking the performer's finger locations in real time. The virtual tutorial objects, in one example, includes graphical elements presented on a virtual scroll that appears to move toward the instrument at a speed correlated with the song tempo. The hand tracking utility calculates a set of expected fingertip coordinates based on a detected hand shape.

15 Claims, 15 Drawing Sheets

(51) Int. Cl.
  *G06T 7/50* (2017.01)
  *G06T 7/70* (2017.01)
  *G06T 11/00* (2006.01)
  *G10H 1/00* (2006.01)

(52) U.S. Cl.
  CPC ........... *G06T 11/00* (2013.01); *G10H 1/0016* (2013.01); *G06T 2200/24* (2013.01); *G06T 2207/10016* (2013.01); *G06T 2207/10028* (2013.01); *G06T 2207/30244* (2013.01); *G10H 2210/076* (2013.01); *G10H 2220/091* (2013.01)

(58) Field of Classification Search
  CPC . G06T 2207/10016; G06T 2207/10028; G06T 2207/30244; G06F 3/011; G10H 1/0016; G10H 2210/076; G10H 2220/091
  See application file for complete search history.

(56) References Cited

U.S. PATENT DOCUMENTS

| | | |
|---|---|---|
| 9,098,739 B2 | 8/2015 | Mutto et al. |
| 9,207,771 B2 | 12/2015 | Antoniac |
| 9,235,051 B2 | 1/2016 | Salter et al. |
| 9,459,454 B1 | 10/2016 | The et al. |
| 9,541,996 B1 | 1/2017 | Baxter et al. |
| 9,552,673 B2 | 1/2017 | Hilliges et al. |
| 9,990,029 B2 | 6/2018 | Kochi |
| 9,996,983 B2 | 6/2018 | Mullins |
| 10,057,400 B1 | 8/2018 | Gordon et al. |
| 10,146,414 B2 | 12/2018 | Heater |
| 10,220,303 B1 | 3/2019 | Schmidt et al. |
| 10,372,228 B2 | 8/2019 | Mao et al. |
| 10,394,334 B2 | 8/2019 | Wang |
| 10,509,461 B2 | 12/2019 | Mullen |
| 10,579,207 B2 | 3/2020 | Piya et al. |
| 10,642,369 B2 | 5/2020 | Iyer et al. |
| 10,782,779 B1 | 9/2020 | Eubank et al. |
| 10,852,838 B2 | 12/2020 | Bradski et al. |
| 10,853,991 B1 | 12/2020 | Yan et al. |
| 10,902,250 B2 | 1/2021 | Konin et al. |
| 10,909,762 B2 | 2/2021 | Karalis et al. |
| 10,928,975 B2 | 2/2021 | Wang et al. |
| 10,936,080 B2 | 3/2021 | Marcolina et al. |
| 11,003,307 B1 | 5/2021 | Ravasz et al. |
| 11,086,126 B1 | 8/2021 | Gollier et al. |
| 11,275,453 B1 | 3/2022 | Tham et al. |
| 11,277,597 B1 | 3/2022 | Canberk et al. |
| 11,294,472 B2 | 4/2022 | Tang et al. |
| 11,320,911 B2 | 5/2022 | Schwarz et al. |
| 11,334,179 B2 | 5/2022 | Li et al. |
| 11,380,021 B2 | 7/2022 | Nakata |
| 11,481,025 B2 | 10/2022 | Shimizu et al. |
| 11,494,000 B2 | 11/2022 | Katz et al. |
| 11,500,512 B2 | 11/2022 | Reithmeir et al. |
| 11,520,399 B2 | 12/2022 | Kang et al. |
| 11,531,402 B1 | 12/2022 | Stolzenberg |
| 11,546,505 B2 | 1/2023 | Canberk |
| 11,631,228 B2 | 4/2023 | Fieldman |
| 2005/0271279 A1 | 12/2005 | Fujimura et al. |
| 2007/0220108 A1 | 9/2007 | Whitaker |
| 2008/0219502 A1 | 9/2008 | Shamaie |
| 2009/0119609 A1 | 5/2009 | Matsumoto |
| 2010/0085317 A1 | 4/2010 | Park et al. |
| 2011/0213664 A1 | 9/2011 | Osterhout et al. |
| 2012/0027252 A1 | 2/2012 | Liu et al. |
| 2012/0027263 A1 | 2/2012 | Liu et al. |
| 2012/0056730 A1 | 3/2012 | Ujiie et al. |
| 2012/0086729 A1 | 4/2012 | Baseley et al. |
| 2012/0113223 A1 | 5/2012 | Hilliges et al. |
| 2012/0194644 A1 | 8/2012 | Newcombe et al. |
| 2012/0327117 A1 | 12/2012 | Weller et al. |
| 2013/0145320 A1 | 6/2013 | Oosterholt et al. |
| 2013/0328927 A1 | 12/2013 | Mount et al. |
| 2014/0043211 A1 | 2/2014 | Park |
| 2014/0212000 A1 | 7/2014 | Yagcioglu et al. |
| 2014/0225918 A1 | 8/2014 | Mittal et al. |
| 2014/0306993 A1 | 10/2014 | Poulos et al. |
| 2014/0347289 A1 | 11/2014 | Suh et al. |
| 2014/0361988 A1 | 12/2014 | Katz et al. |
| 2014/0368533 A1 | 12/2014 | Salter et al. |
| 2015/0049017 A1 | 2/2015 | Weber et al. |
| 2015/0073753 A1 | 3/2015 | Rameau |
| 2015/0091824 A1 | 4/2015 | Hori |
| 2015/0097719 A1 | 4/2015 | Balachandreswaran et al. |
| 2015/0109197 A1 | 4/2015 | Takagi |
| 2015/0199780 A1 | 7/2015 | Beyk |
| 2015/0317833 A1 | 11/2015 | Ebstyne et al. |
| 2015/0331576 A1 | 11/2015 | Piya et al. |
| 2015/0370321 A1 | 12/2015 | Lundberg |
| 2016/0033770 A1 | 2/2016 | Fujimaki et al. |
| 2016/0035134 A1 | 2/2016 | Tanaka et al. |
| 2016/0098093 A1 | 4/2016 | Cheon et al. |
| 2016/0260251 A1 | 9/2016 | Stafford et al. |
| 2016/0261834 A1 | 9/2016 | Li et al. |
| 2016/0306431 A1 | 10/2016 | Stafford et al. |
| 2017/0003746 A1 | 1/2017 | Anglin et al. |
| 2017/0014683 A1 | 1/2017 | Maruyama et al. |
| 2017/0028299 A1 | 2/2017 | The et al. |
| 2017/0053447 A1 | 2/2017 | Chen et al. |
| 2017/0097687 A1 | 4/2017 | Pinault et al. |
| 2017/0123487 A1 | 5/2017 | Hazra et al. |
| 2017/0124713 A1 | 5/2017 | Jurgenson et al. |
| 2017/0140552 A1 | 5/2017 | Woo et al. |
| 2017/0235372 A1 | 8/2017 | Song et al. |
| 2017/0270711 A1 | 9/2017 | Schoenberg |
| 2017/0293364 A1 | 10/2017 | Wang |
| 2017/0295446 A1 | 10/2017 | Shivappa |
| 2017/0323488 A1 | 11/2017 | Mott et al. |
| 2017/0352184 A1 | 12/2017 | Poulos et al. |
| 2017/0357334 A1 | 12/2017 | Balan et al. |
| 2018/0005443 A1 | 1/2018 | Poulos et al. |
| 2018/0024641 A1 | 1/2018 | Mao et al. |
| 2018/0039852 A1 | 2/2018 | Nakamura et al. |
| 2018/0075659 A1 | 3/2018 | Browy et al. |
| 2018/0196503 A1 | 7/2018 | Ikeda et al. |
| 2018/0259775 A1 | 9/2018 | Ono et al. |
| 2018/0329209 A1 | 11/2018 | Nattukallingal |
| 2019/0025595 A1 | 1/2019 | Fukuda et al. |
| 2019/0025931 A1 | 1/2019 | Anderson et al. |
| 2019/0102927 A1 | 4/2019 | Yokokawa |
| 2019/0122085 A1 | 4/2019 | Tout et al. |
| 2019/0139320 A1 | 5/2019 | Davies et al. |
| 2019/0146598 A1 | 5/2019 | Peri |
| 2019/0155394 A1 | 5/2019 | Bedikian et al. |
| 2019/0167352 A1 | 6/2019 | Mahfouz |
| 2019/0220098 A1 | 7/2019 | Gupta |
| 2019/0299059 A1 | 10/2019 | Case, Jr. et al. |
| 2019/0318544 A1 | 10/2019 | Skidmore et al. |
| 2019/0324553 A1 | 10/2019 | Liu et al. |
| 2019/0325651 A1 | 10/2019 | Bradner et al. |
| 2019/0361521 A1 | 11/2019 | Stellmach et al. |
| 2019/0377416 A1 | 12/2019 | Alexander |
| 2019/0385371 A1 | 12/2019 | Joyce et al. |
| 2020/0005026 A1 | 1/2020 | Andersen et al. |
| 2020/0064924 A1 | 2/2020 | Poupyrev et al. |
| 2020/0097065 A1 | 3/2020 | Iyer et al. |
| 2020/0151900 A1 | 5/2020 | Weising et al. |
| 2020/0218423 A1 | 7/2020 | Ohashi |
| 2020/0311396 A1 | 10/2020 | Pollefeys et al. |
| 2020/0312029 A1* | 10/2020 | Heinen ................... G06T 17/20 |
| 2020/0387228 A1 | 12/2020 | Ravasz et al. |
| 2021/0019036 A1 | 1/2021 | Wang et al. |
| 2021/0041702 A1 | 2/2021 | Kimura et al. |
| 2021/0090337 A1 | 3/2021 | Ravasz et al. |
| 2021/0096726 A1 | 4/2021 | Faulkner et al. |
| 2021/0174519 A1 | 6/2021 | Bazarevsky et al. |
| 2021/0181938 A1 | 6/2021 | Hassan et al. |
| 2021/0208698 A1 | 7/2021 | Martin et al. |
| 2021/0209153 A1 | 7/2021 | Zhang |
| 2021/0263593 A1 | 8/2021 | Lacey |
| 2021/0275914 A1 | 9/2021 | Wu et al. |
| 2021/0286502 A1 | 9/2021 | Lemay et al. |

(56) References Cited

U.S. PATENT DOCUMENTS

| | | | |
|---|---|---|---|
| 2021/0334524 | A1 | 10/2021 | Guo et al. |
| 2021/0373650 | A1 | 12/2021 | Kang et al. |
| 2021/0397266 | A1 | 12/2021 | Gupta et al. |
| 2022/0088476 | A1 | 3/2022 | Canberk et al. |
| 2022/0103748 | A1 | 3/2022 | Canberk |
| 2022/0139056 | A1 | 5/2022 | Fieldman |
| 2022/0171479 | A1 | 6/2022 | Chappaz et al. |
| 2022/0179495 | A1 | 6/2022 | Agrawal et al. |
| 2022/0206102 | A1 | 6/2022 | Brown |
| 2022/0206588 | A1 | 6/2022 | Canberk et al. |
| 2023/0082789 | A1 | 3/2023 | Lu et al. |
| 2023/0117197 | A1 | 4/2023 | Stolzenberg |
| 2023/0274511 | A1 | 8/2023 | Miller et al. |

FOREIGN PATENT DOCUMENTS

| | | |
|---|---|---|
| EP | 3699736 A1 | 8/2020 |
| WO | 2015192117 A1 | 12/2015 |

OTHER PUBLICATIONS

Chatain, Julia et al., "DigiGlo: Exploring the Palm as an Input and Display Mechanism through Digital Gloves," Association for Computing Machinery, CHI PLAY '20, Nov. 2-4, 2020, Virtual Event, Canada, 12 pages.

International Search Report and Written Opinion for International Application No. PCT/US2022/023608, dated Jul. 11, 2022 (dated Jul. 11, 2022)—12 pages.

International Search Report and Written Opinion for International Application No. PCT/US2022/024565, dated Jul. 25, 2022 (dated Jul. 25, 2022)—15 pages.

U.S. Appl. No. 17/589,065, filed Jan. 31, 2022 to Stolzenberg.

U.S. Appl. No. 17/714,352, filed Apr. 6, 2022 to Hwang et al.

U.S. Appl. No. 17/719,654, filed Apr. 13, 2022 to Hwang et al.

Google Atap: "Welcome to Project Soli", published May 29, 2015, XP055903745, Retrieved from the Internet: URL: https://www.youtube.com/watch?v=OQNiZf SsPc0&t=61s [retrieved on Mar. 21, 2022].

International Search Report and Written Opinion for International Application No. PCT/US2021/063340, dated Apr. 4, 2022 (dated Apr. 5, 2022)—10 pages.

Song, Chen, "Sensor Fusion for Learning-based Tracking of Controller Movement in Virtual Reality". Sep. 2019, IEEE, pp. 1-5. (Year: 2019).

U.S. Appl. No. 16/865,995, filed May 4, 2020 to Canberk, et al.

U.S. Appl. No. 17/588,934, filed Jan. 31, 2022 to Stolzenberg, et al.

Cas and Chary VR: https://www.youtube.com/watch?v= _8VqQfr HG94, viewed on Dec. 4, 2021, published online on Feb. 25, 2020 (Year: 2020).

Cirulis Arnis: "Large Scale Augmented Reality for Collaborative Environments", Jul. 10, 2020 (Jul. 10, 2020), Computer Vision—ECCV 2020 : 16th European Conference, Glasgow, UK, Aug. 23-28, 2020 : Proceedings; [Lecture Notes in Computer Science ; ISSN 0302-9743], Springer International Publishing, Cham, pp. 325-335, XP047554326, ISBN: 978-3-030-58594-5.

Engadget: "Google Glass Gesture Recognition by OnTheGo Platforms at CES 2014 : Engadget", Jan. 8, 2014 (Jan. 8, 2014), XP055859805, Retrieved from the Internet: URL:https://www.youtube.com/watch?v=d_jl _ZxPECg [retrieved on Nov. 11, 2021] 00:39s, 00:55s, 01:00-01:10s.

International Search Report and Written Opinion for International Application No. PCT/US2021/033642, dated Aug. 30, 2021 (dated Aug. 30, 2021)—11 pages.

International Search Report and Written Opinion for International Application No. PCT/US2021/051109, dated Dec. 10, 2021 (dated Dec. 10, 2021)—17 pages.

International Search Report and Written Opinion for International Application No. PCT/US2021/063295, dated Mar. 17, 2022 (dated Mar. 17, 2022)—13 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics, Springer Berlin Heidelberg, Berlin, Heidelberg, pp. 732-747, XP047033542, ISBN: 978-3-642-39061-6, p. 740; figure 4.

Partial International Search Report and Written Opinion for International Application No. PCT/US2021/047637, dated Jan. 7, 2022 (dated Jan. 7, 2022)—10 pages.

\* cited by examiner

VIRTUAL TUTORIALS FOR MUSICAL INSTRUMENTS WITH FINGER TRACKING IN AUGMENTED REALITY

CROSS-REFERENCE TO RELATED APPLICATIONS

This application is a Continuation of U.S. application Ser. No. 16/865,995 filed on May 4, 2020, the contents of which are incorporated fully herein by reference

TECHNICAL FIELD

Examples set forth in the present disclosure relate to the field of augmented reality (AR) and wearable electronic devices such as eyewear. More particularly, but not by way of limitation, the present disclosure describes real-time finger tracking and the display of virtual tutorial objects in augmented reality for guiding a performer playing a musical instrument.

BACKGROUND

Many types of computers and electronic devices available today, such as mobile devices (e.g., smartphones, tablets, and laptops), handheld devices (e.g., smart rings, special-purpose accessories), and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Augmented reality (AR) combines real objects in a physical environment with virtual objects. The combined display gives the impression that the virtual objects are authentically present in the environment, especially when the virtual objects appear and behave like the real objects.

Advanced AR technologies, such as computer vision and object tracking, may be used to create a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
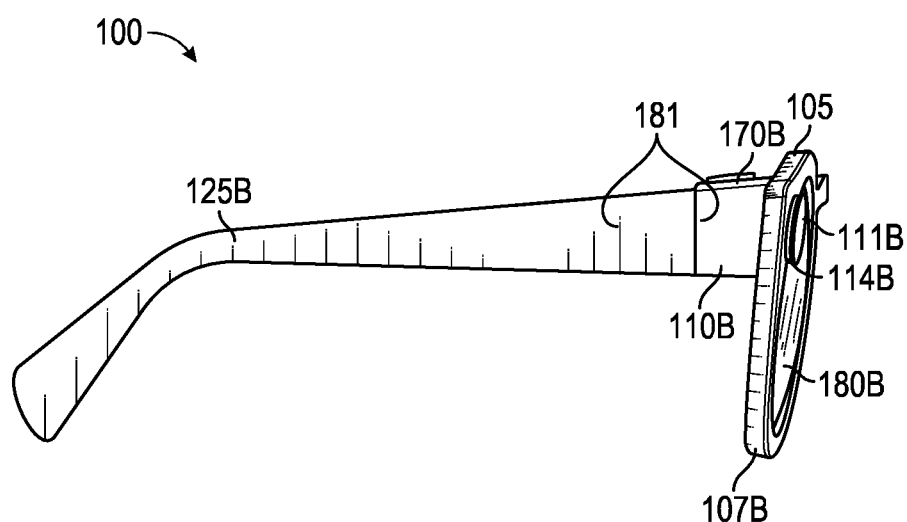
FIG. 1A is a side view (right) of an example hardware configuration of an eyewear device suitable for use in an augmented reality production system.

Various implementations and details are described with reference to an example: a system for presenting a tutorial (e.g., for a musical instrument) in augmented reality on the display of an eyewear device. The eyewear device includes a camera, a processor, a memory, and a display. The camera is configured to capture sequences of frames of video data, wherein each frame of video data includes depth information for a plurality of pixels. A marker registration utility registers a marker location on a musical instrument in a physical environment. The marker location includes marker coordinates associated with the depth information. Programming on the eyewear device retrieves from the memory a set of data associated with the musical instrument. The set of data includes the marker location, a plurality of actuator locations correlated with the marker location, and a set of sounds. Each sound is associated with a set of finger engagements with one or more of the actuator locations. Programming on the eyewear device retrieves from the memory a song file correlated with the musical instrument. The song file includes a tempo and a sequence of notes and note values. A localization utility determines a local position of the eyewear device relative to the marker location. A virtual object rendering utility presents a series of virtual tutorial objects on the display relative to the marker location during playback of the song file, and in accordance with the local position of the eyewear device. The series of virtual tutorial objects includes graphical elements appearing near one or more of the actuator locations in accordance with the song file. In a further aspect, a hand tracking utility detects a hand shape in a frame of the video data, using the depth information for a plurality of pixels. The hand tracking utility calculates a set of expected fingertip coordinates based on the detected hand shape. For each note in the sequence of notes in the song file, the hand tracking utility calculates a sum of the geodesic distances between the set of expected fingertip coordinates and a set of correct fingertip positions. In response to determining that the sum is greater than a threshold accuracy value, the hand tracking utility presents a failure indicator on the display.

Although the various systems and methods are described herein with reference to playing a musical instrument, the technology described may be applied to guide the manipulation of other kinds of objects or instruments, such as surgical devices, hand tools, parts to be assembled, input components like keyboards and keypads, and the like.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, the handheld device, associated components and any other complete devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
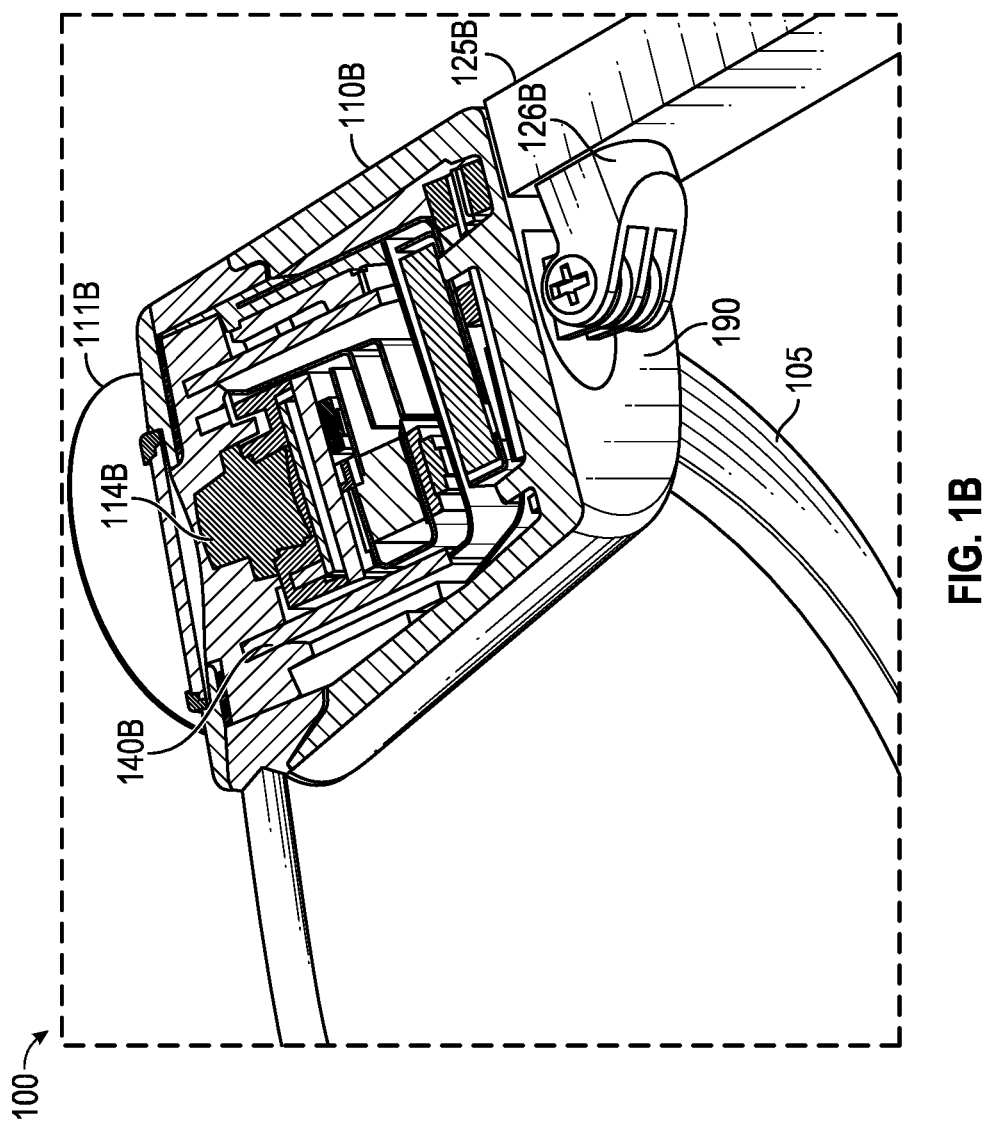
FIG. 1B is a top, partly sectional view of a right corner of the eyewear device of FIG. 1A depicting a right visible-light camera, and a circuit board.
Figure 1C:
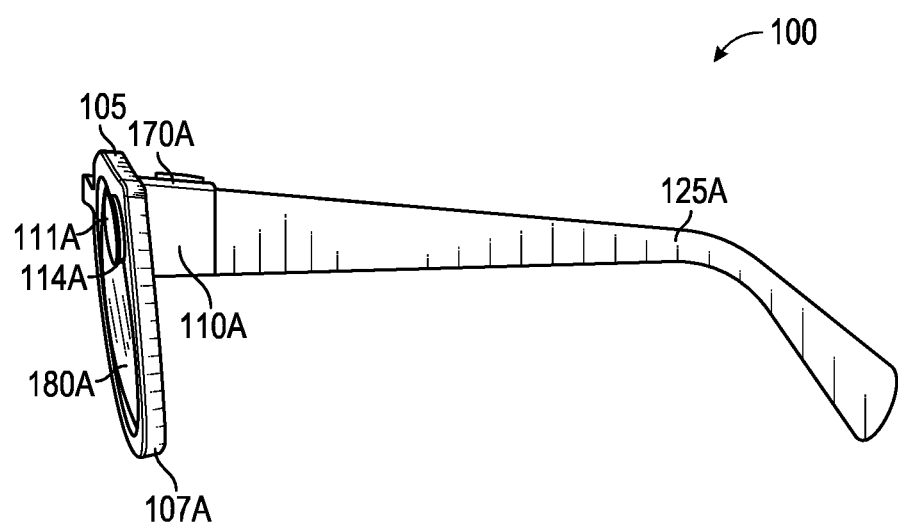
FIG. 1C is a side view (left) of an example hardware configuration of the eyewear device of FIG. 1A, which shows a left visible-light camera.
Figure 1D:
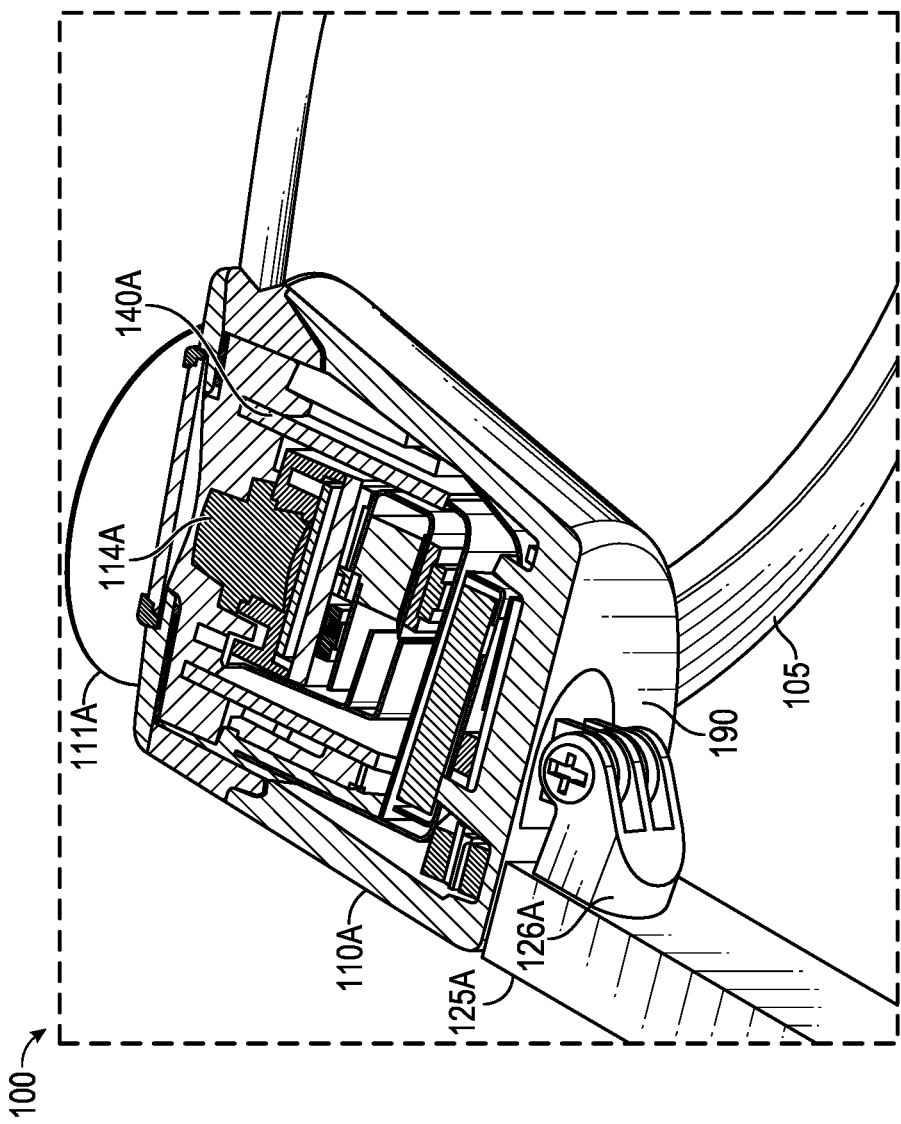
FIG. 1D is a top, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
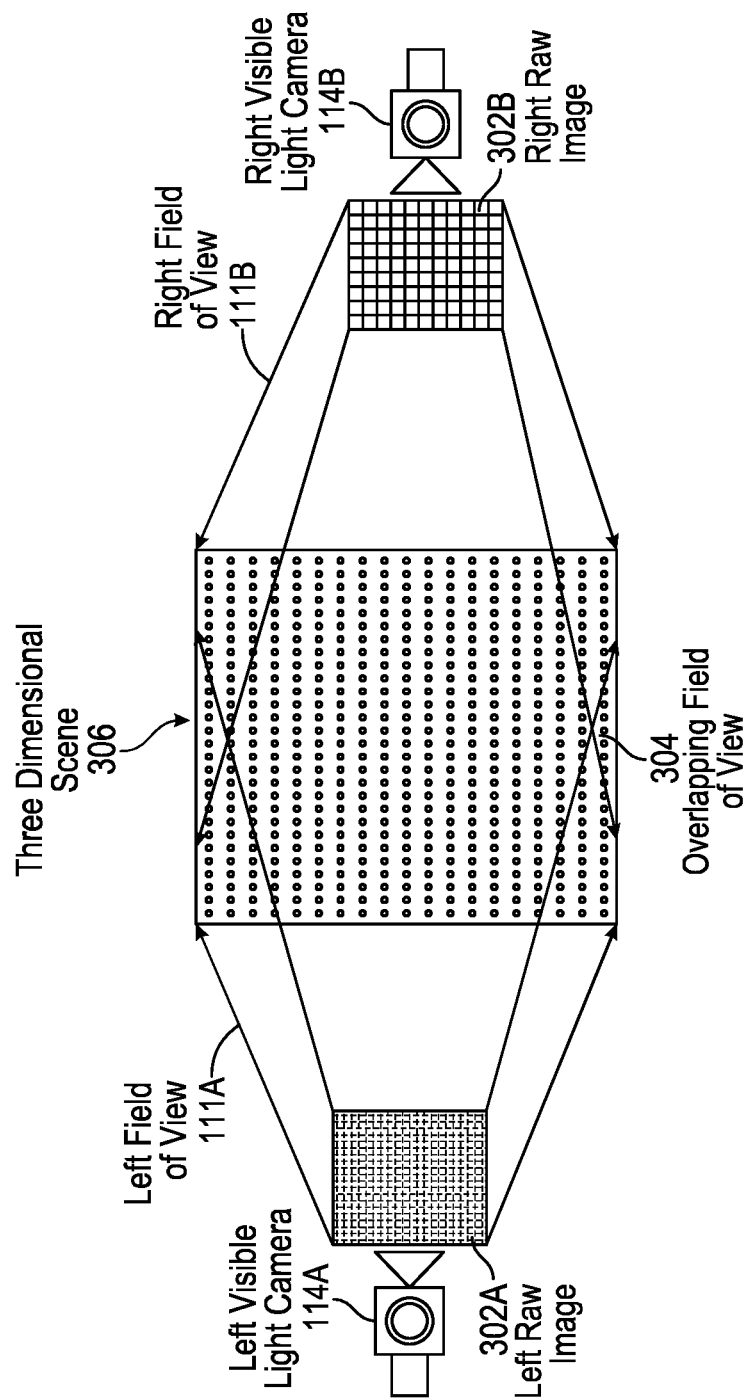
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412 or another processor, which controls operation of the visible-light cameras 114A, 114B to act as a stereo camera simulating human binocular vision, may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the augmented reality tutorial system 400 (FIG. 4) includes the eyewear device 100, which includes a frame 105 and a left temple 110A extending from a left lateral side 170A of the frame 105 and a right temple 125B extending from a right lateral side 170B of the frame 105. The eyewear device 100 may further include at least two visible-light cameras 114A, 114B which may have overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

FIG. 1B is a top cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left corner 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
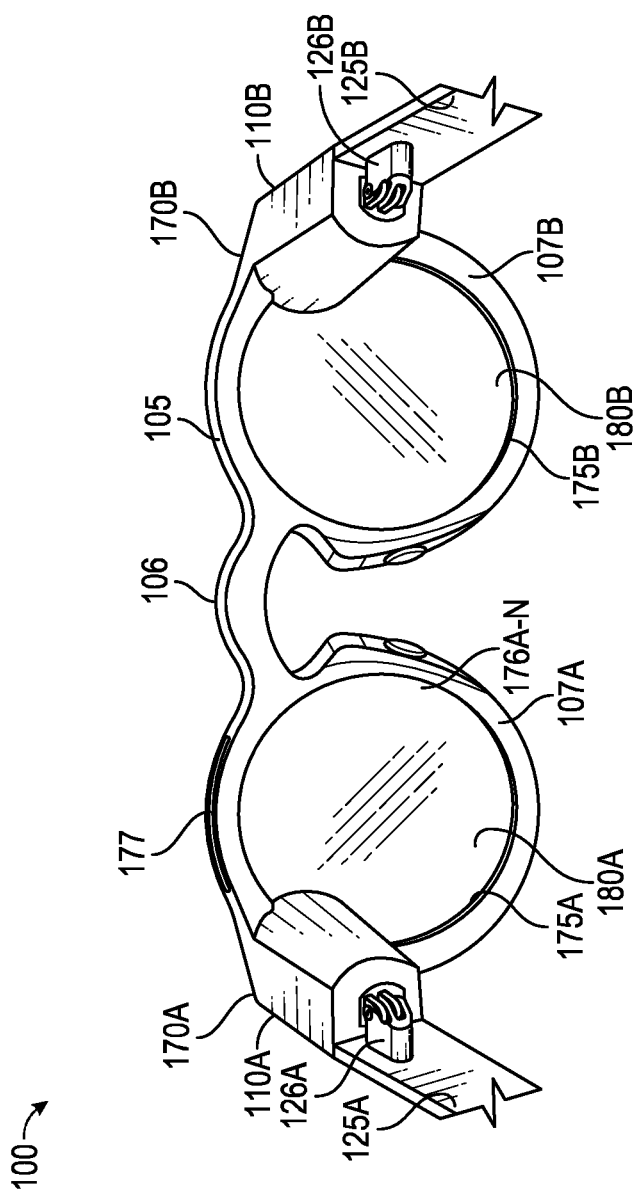
FIGS. 2A and 2B are rear views of example hardware configurations of an eyewear device utilized in the augmented reality production system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
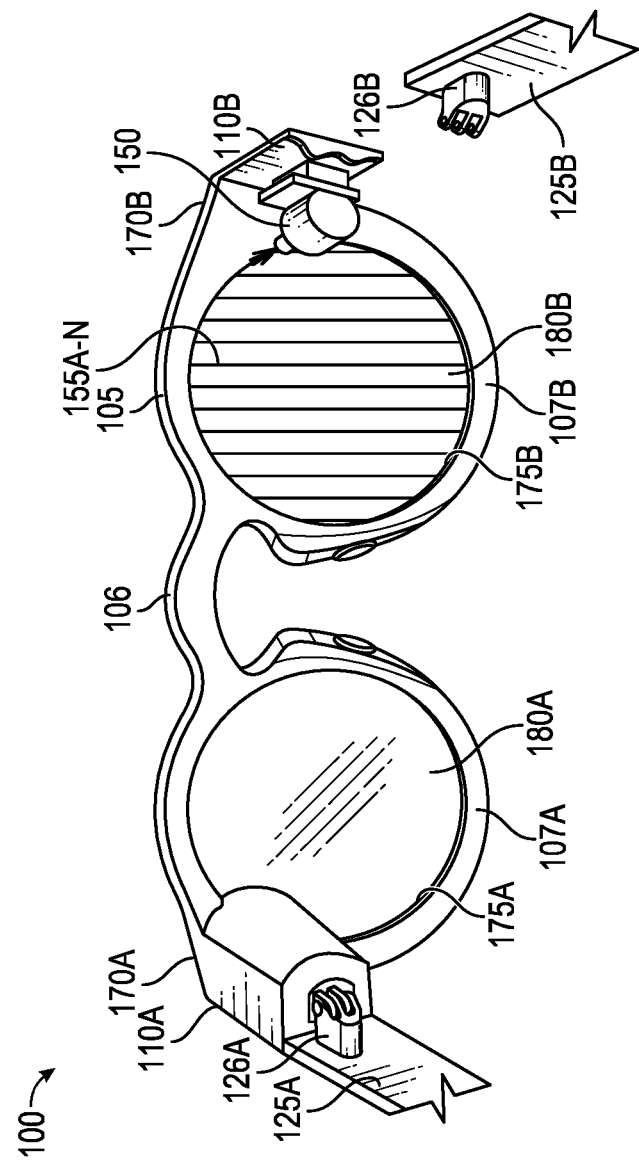

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector (not shown) and a right projector 150. The left optical assembly 180A may include a left display matrix 177 or a left set of optical strips (not shown) which are configured to interact with light from the left projector. Similarly, the right optical assembly 180B may include a right display matrix (not shown) or a right set of optical strips 155A, 155B, . . . 155N (155 double prime, A through N), which are configured to interact with light from the right projector 150. In this example, the eyewear device 100 includes a left display and a right display.

Figure 4:
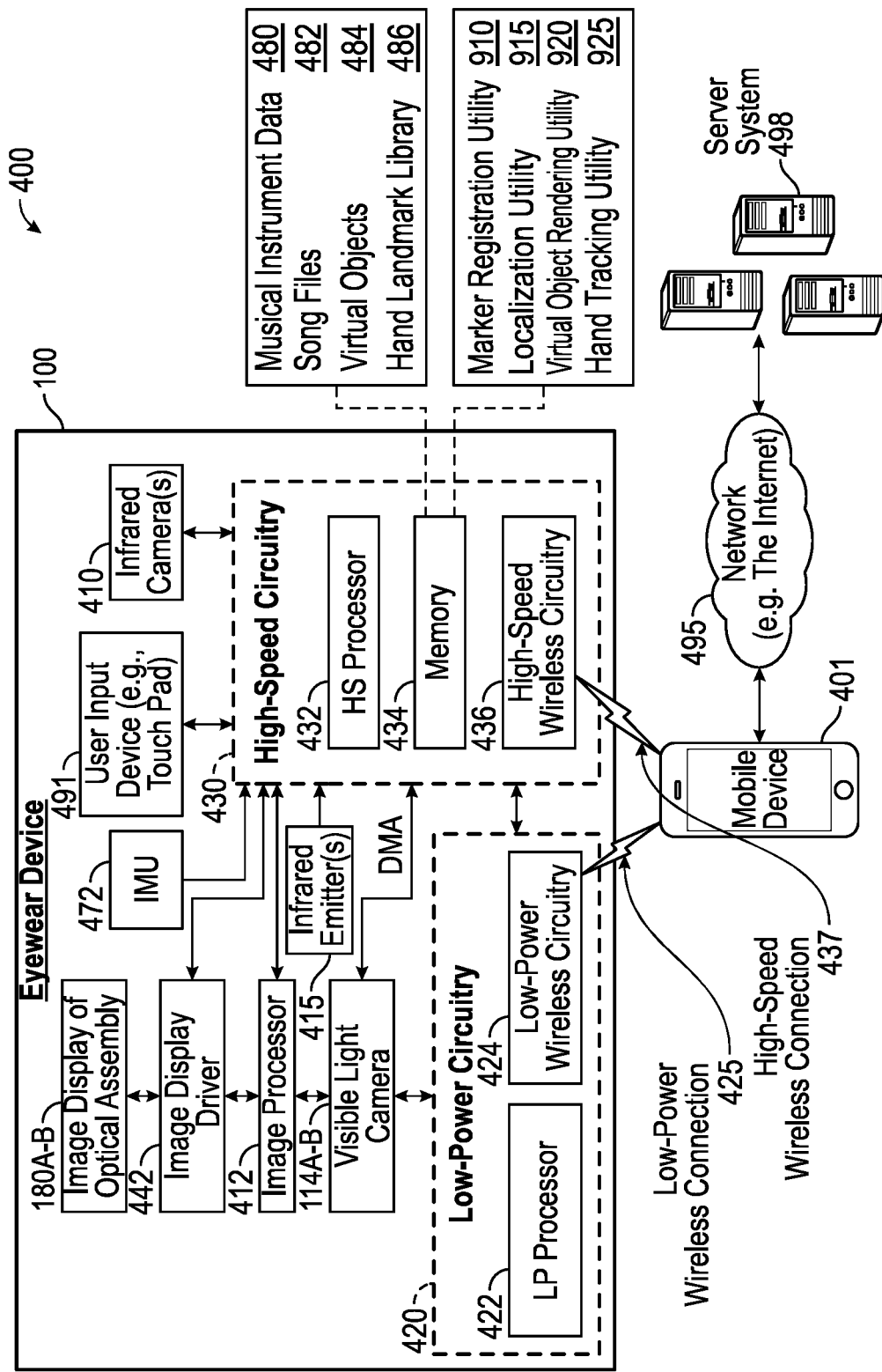
FIG. 4 is a functional block diagram of an example augmented reality production system including a wearable device (e.g., an eyewear device) and a server system connected via various networks.

FIG. 4 is a functional block diagram of an example augmented reality tutorial system 400 that includes a wearable device (e.g., an eyewear device 100), a mobile device 401, and a server system 498 connected via various networks 495 such as the Internet. The augmented reality tutorial system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
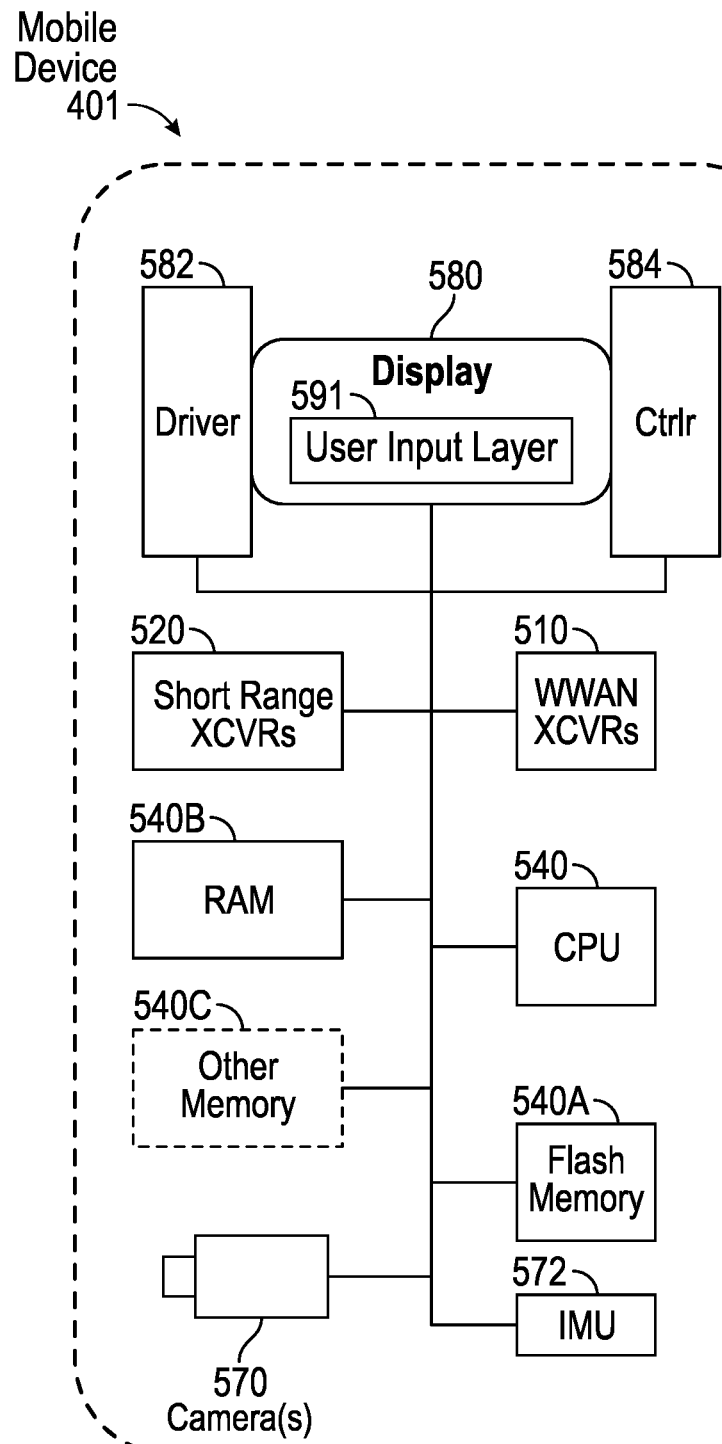
FIG. 5 is a diagrammatic representation of an example hardware configuration for a mobile device of the augmented reality production system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 540 of the mobile device 401 may be coupled to a camera system 570, a mobile display driver 582, a user input layer 891, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS receiver, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The augmented reality tutorial system 400, as shown in FIG. 4, includes a computing device, such as mobile device 401, coupled to an eyewear device 100 over a network. The augmented reality tutorial system 400 includes a memory for storing instructions and a processor for executing the instructions. Execution of the instructions of the augmented reality tutorial system 400 by the processor 432 configures the eyewear device 100 to cooperate with the mobile device 401. The augmented reality tutorial system 400 may utilize the memory 434 of the eyewear device 100 or the memory elements 540A, 540B, 540C of the mobile device 401 (FIG. 5). Also, the augmented reality tutorial system 400 may utilize the processor elements 432, 422 of the eyewear device 100 or the central processing unit (CPU) 540 of the mobile device 401 (FIG. 5). In addition, the augmented reality tutorial system 400 may further utilize the memory and processor elements of the server system 498. In this aspect, the memory and processing functions of the augmented reality tutorial system 400 can be shared or distributed across the eyewear device 100, the mobile device 401, and the server system 498.

FIG. 5 is a high-level functional block diagram of an example mobile device 401. Mobile device 401 includes a flash memory 540A which stores programming to be executed by the CPU 540 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 4, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 401 with a user interface that includes a touchscreen input layer 891 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 540 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the mobile device 401 by configuring the mobile device 401 to perform various operations, for example, in accordance with instructions or programming executable by CPU 540. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of mobile device 401, the flash memory 540A is used to store programming or instructions for execution by the CPU 540. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, position information received from a GPS unit, or a combination of two or more of such sensor data, or from other sensors providing data useful in determining positional information.

Figure 6:
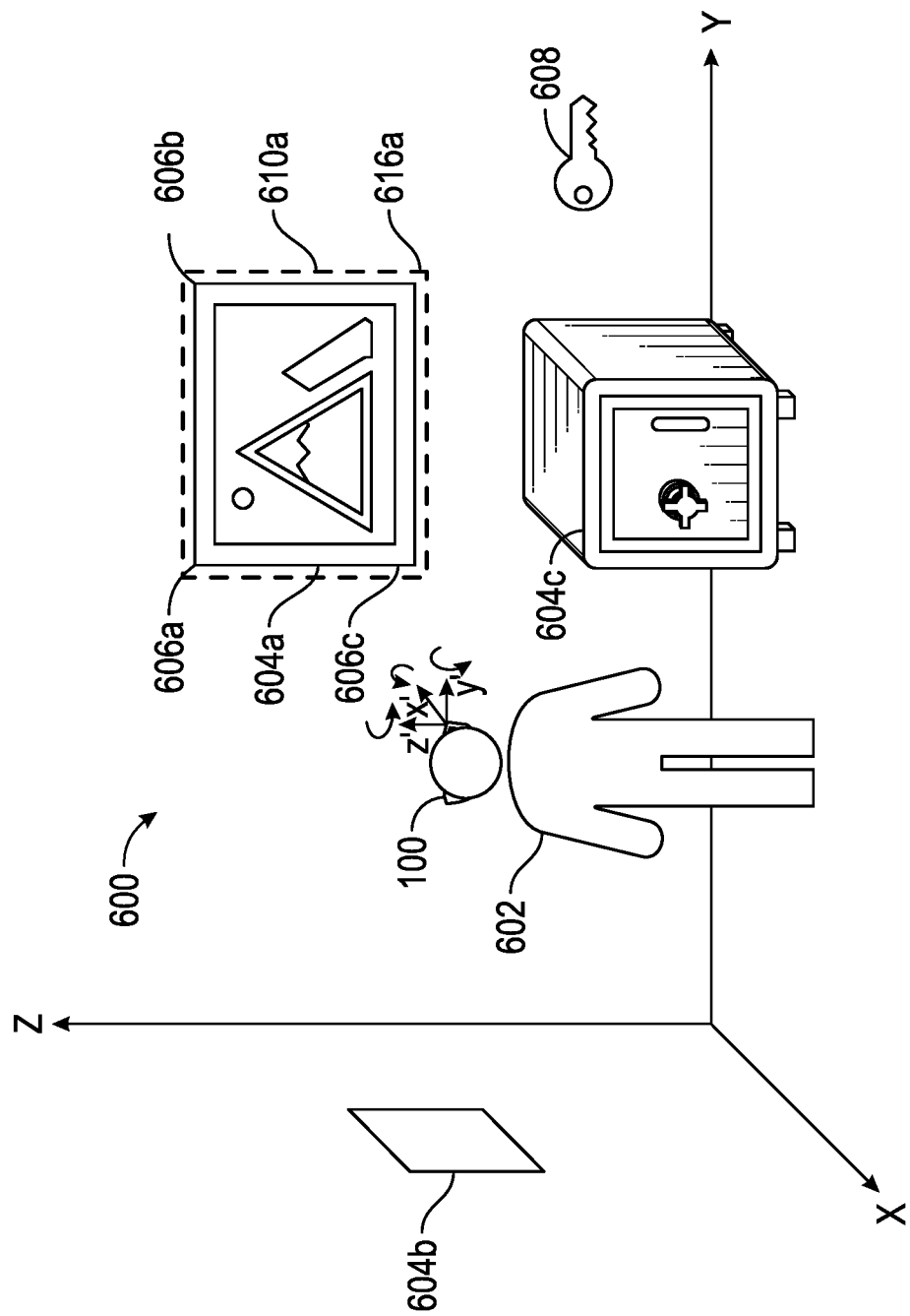
FIG. 6 is a schematic illustration of a user in an example environment for use in describing simultaneous localization and mapping.

FIG. 6 depicts an example environment 600 along with elements that are useful for natural feature tracking (NFT; e.g., a tracking application using a SLAM algorithm). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606*a*, 606*b*, and 606*c*) associated with a single object 604*a*, or by using one or more location points 606 associated with two or more objects 604*a*, 604*b*, 604*c*. The processor 432 of the eyewear device 100 may position a virtual object 608 (such as the key shown in FIG. 6) within the environment 600 for augmented reality viewing via image displays 180.

Figure 7:
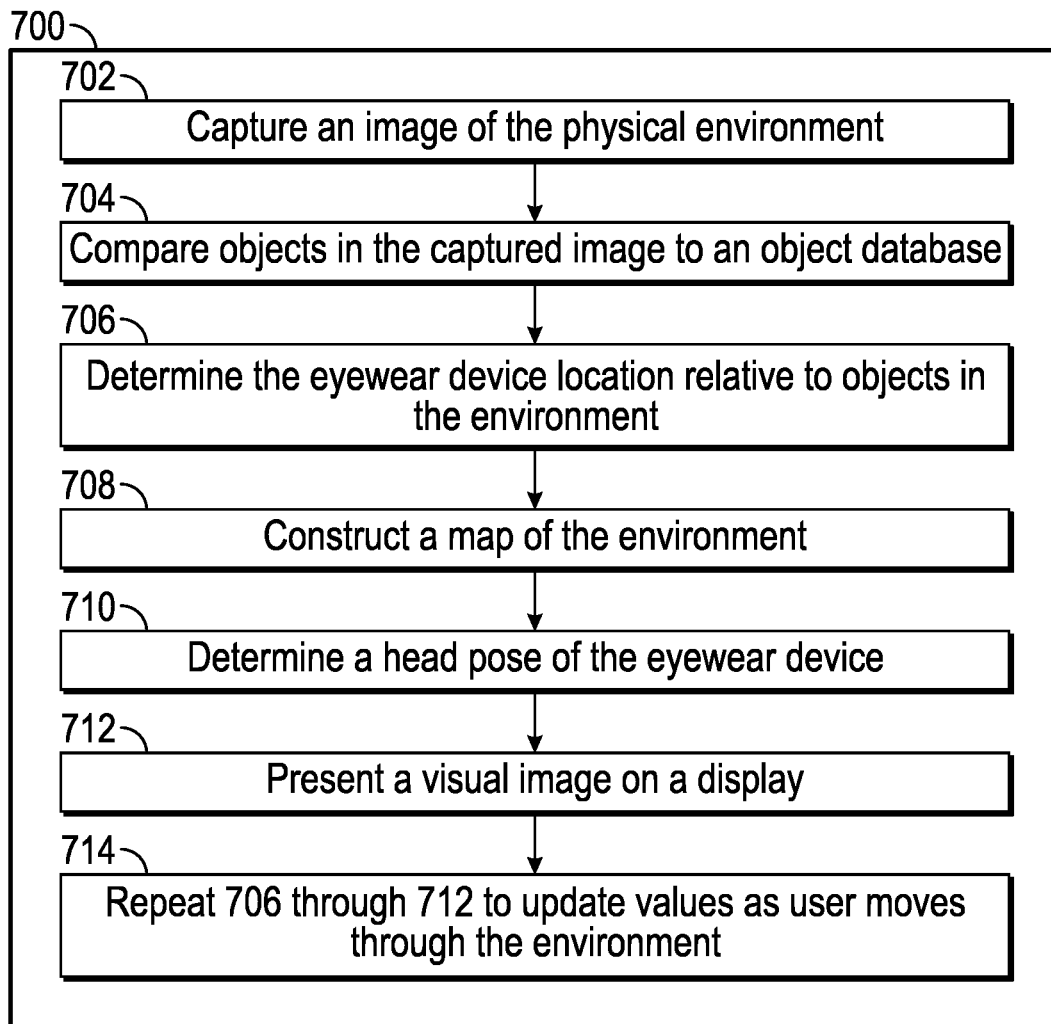
FIG. 7 is a flow chart listing steps in an example method of displaying virtual objects in a physical environment.

FIG. 7 is a flow chart 700 depicting a method for implementing augmented reality applications described herein on a wearable device (e.g., an eyewear device). Although the steps are described with reference to the eyewear device 100, as described herein, other implementations of the steps described, for other types of devices, will be understood by one of skill in the art from the description herein. Additionally, it is contemplated that one or more of the steps shown in FIG. 7, and in other figures, and described herein may be omitted, performed simultaneously or in a series, performed in an order other than illustrated and described, or performed in conjunction with additional steps.

At block 702, the eyewear device 100 captures one or more input images of a physical environment 600 near the eyewear device 100. The processor 432 may continuously receive input images from the visible light camera(s) 114 and store those images in memory 434 for processing. Additionally, the eyewear device 100 may capture information from other sensors (e.g., location information from a GPS sensor or distance information from a laser distance sensor).

At block 704, the eyewear device 100 compares objects in the captured images to objects stored in a library of images to identify a match. In some implementations, the processor 432 stores the captured images in memory 434. A library of images of known objects is stored in a virtual object database 484.

In one example, the processor 432 is programmed to identify a predefined particular object (e.g., a particular picture 604*a* hanging in a known location on a wall, a window 604*b* in another wall, or an object such as a safe 604*c* positioned on the floor). Other sensor data, such as GPS data, may be used to narrow down the number of known objects for use in the comparison (only images associated with a room identified through GPS coordinates). In another example, the processor 432 is programmed to identify predefined general objects (such as one or more trees within a park).

At block 706, the eyewear device 100 determines its position with respect to the object(s). The processor 432 may determine its position with respect to the objects by comparing and processing distances between two or more points in the captured images (e.g., between two or more location points on one objects 604 or between a location point 606 on each of two objects 604) to known distances be between corresponding points in the identified objects. Distances between the points of the captured images greater than the points of the identified objects indicates the eyewear device 100 is closer to the identified object than the imager that captured the image including the identified object. On the other hand, distances between the points of the captured images less than the points of the identified objects indicates the eyewear device 100 is further from the identified object than the imager that captured the image including the identified object. By processing the relative distances, the processor 432 is able to determine the position within respect to the objects(s). Alternatively, or additionally, other sensor information, such as laser distance sensor information, may be used to determine position with respect to the object(s).

At block 708, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and determines its position within that coordinate system based on the determined positions (block 706) with respect to the identified objects. In another example, the eyewear device constructs a map using images of permanent or semi-permanent objects 604 within an environment (e.g., a tree or a park bench within a park). In accordance with this example, the eyewear device 100 may define the coordinate system $(x^t, y^t, z^t)$ used for the environment.

At block 710, the eyewear device 100 determines a head pose (roll, pitch, and yaw) of the eyewear device 100 within the environment. The processor 432 determines head pose by using two or more location points (e.g., three location points 606a, 606b, and 606c) on one or more objects 604 or by using one or more location points 606 on two or more objects 604. Using conventional image processing algorithms, the processor 432 determines roll, pitch, and yaw by comparing the angle and length of a lines extending between the location points for the for the captured images and the known images.

At block 712, the eyewear device 100 presents visual images to the user. The processor 432 presents images to the user on the image displays 180 using the image processor 412 and the image display driver 442. The processor develops and presents the visual images via the image displays responsive to the location of the eyewear device 100 within the environment 600.

At block 714, the steps described above with reference to blocks 706-712 are repeated to update the position of the eyewear device 100 and what is viewed by the user 602 as the user moves through the environment 600.

Referring again to FIG. 6, the method of implementing augmented reality applications described herein, in this example, includes a virtual marker 610a that associated with a physical object 604a in the environment 600. In an AR system, markers are registered at locations in the environment to assist devices with the task of tracking and updating the location of users and devices in a mapped environment. Markers are sometimes registered to a high-contrast physical object, such as the relatively dark object 604a mounted on a lighter-colored wall, to assist cameras and other sensors with the task of detecting the marker. Markers can be encoded with or otherwise linked to information. A marker might include a code, such as a bar code or a QR code; either visible to the user or hidden. The marker 610a, in this example, is associated with a set of data stored in the memory 434 of the eyewear device 100. The set of data includes information about the marker 610a, a marker location, and one or more virtual objects. The marker location includes three-dimensional coordinates for one or more marker landmarks 616a, such as the corner of the generally rectangular marker 610a shown in FIG. 6. The marker location includes the coordinates of one or more marker landmarks 616a and may be expressed relative to real-world geographic coordinates, a system of marker coordinates, or any other known coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered may be classified as a virtual object in this context. The key 608 shown in FIG. 6, for example, is a virtual object displayed as a still image, either 2D or 3D.

The marker 610a, in this example, is registered in memory as being located near and associated with physical object 604a (e.g., the framed work of art shown in FIG. 6). Markers may be registered using a marker registration utility 910 as described herein. Registration in this example includes identifying and storing the coordinates of one or more marker landmarks 616a that define the size and shape of the marker 610a. One or more of the marker landmarks may or may not coincide closely with one or more location points 606a, 606b, 606c associated with a real physical object 604a.

The marker 610a, in this example, is a fiducial marker because its known size, shape, and orientation (i.e., the values stored as part of the marker location) can be used as a measurement guide and a point of reference. For example, a virtual object rendering utility 920 as described herein uses the marker location to help determine the appropriate size, shape, and orientation when rendering and the one or more virtual objects. In this example, the marker 610a serves as an anchor to the real-world physical environment.

Figure 8:
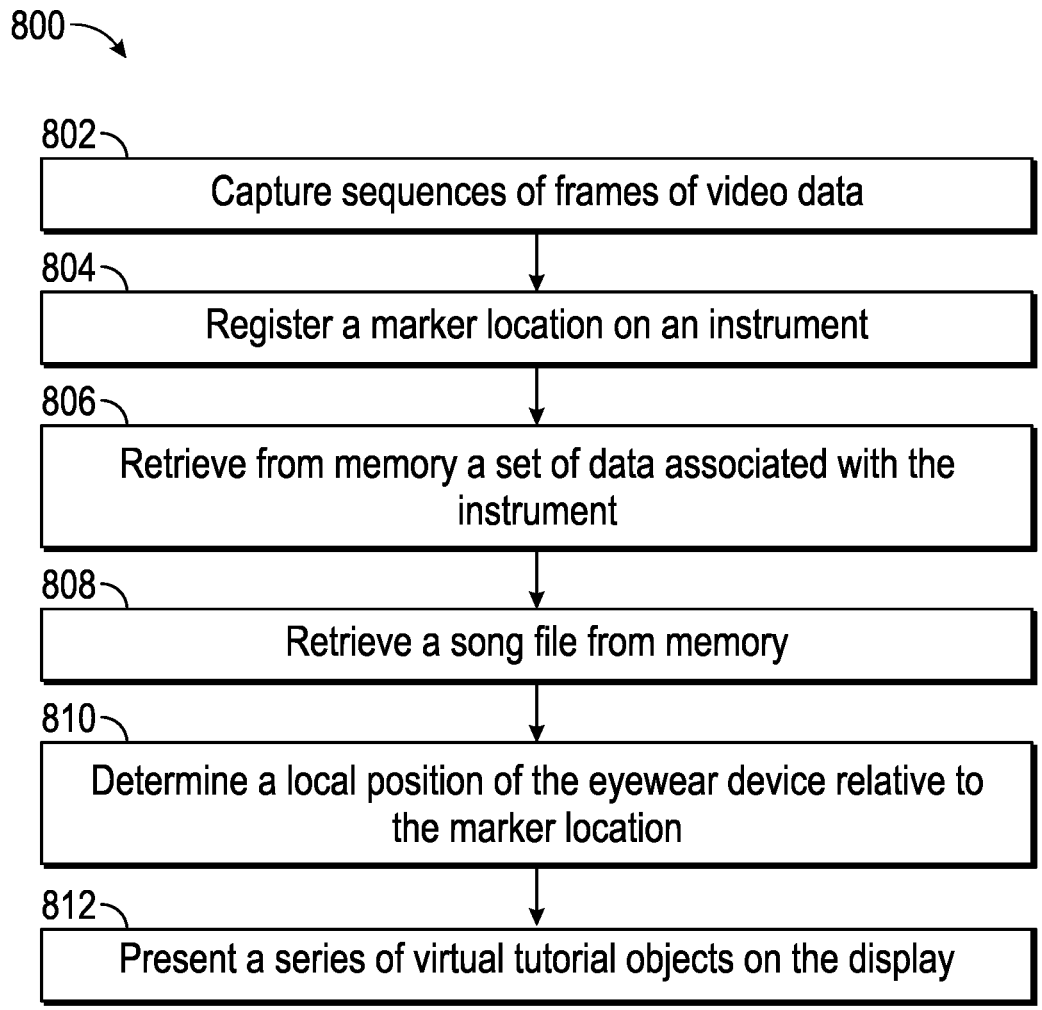
FIG. 8 is a flow chart listing the steps in an example method of presenting a tutorial in augmented reality.

FIG. 8 is a flow chart 800 listing steps in an example method of presenting a tutorial in augmented reality. The method, at step 802, includes capturing sequences of frames of video data with a camera 114A, 114B that is coupled to or part of an eyewear device 100. The camera 114A, 114B, in some implementations, includes one or more high-resolution, digital cameras equipped with a CMOS image sensor capable of capturing high-definition still images and high-definition video. Each frame of digital video includes depth information for a plurality of pixels in the image. In this aspect, the camera 114A, 114B serves as a high-definition scanner by capturing a detailed input image of the environment. The camera 114A, 114B, in some implementations, includes a pair of high-resolution digital cameras 114A, 114B coupled to the eyewear device 100 and spaced apart to acquire a left-camera raw image and a right-camera raw image. When combined, the raw images form an input image that includes a matrix of three-dimensional pixel locations. The method, at step 802, in some implementations, includes storing the captured sequences of frames of video data in memory 434 on the eyewear device 100, at least temporarily, such that the frames are available for analysis.

The method, at step 804 in this example, includes registering a marker location on an instrument, such as a musical instrument, in a physical environment. One or both cameras 114A, 114B on the eyewear device 100 may be used, together with a marker registration utility 910 as described herein, to select and register a marker location. Marker registration includes storing the marker location in memory. The marker location includes a set of three-dimensional marker coordinates based on or correlated with depth information obtained from a digital image or a frame of digital video.

The marker location, in some implementations, coincides with the origin point (0, 0, 0) for a marker coordinate system. The marker coordinate system may be used as a reference for the marker location as well as a variety of other locations on or near the instrument where the marker is placed. For example, when a marker location is registered on or near a particular piano key, the location of all the other piano keys can be expressed in terms of the marker coordinate system.

In augmented-reality systems, markers are registered at locations in the environment to assist devices with the task of tracking and updating the location of users and devices in a mapped environment. Markers are sometimes registered to a physical object having linear edges, high contrast relative to other objects, or other features that make it easier for cameras and other sensors to detect the object and the marker. A marker might include a code, such as a bar code or a QR code; either visible to the user or hidden. A marker can be encoded with or otherwise linked to data or information, and stored, which will remain associated with this particular marker. A fiducial marker can be used as a measurement guide and a point of reference because a fiducial marker has a known size and shape (i.e., values for which are stored when the marker is registered) and a known orientation (obtained when a camera captures an image of the marker). In this aspect, a marker serves as an anchor to the real-world physical environment.

In this example method, no marker has been previously registered on or near this particular musical instrument. After a marker is registered and stored in memory for an instrument, the user may not need to complete this registration step 804 when interacting with this instrument in the future. In such cases, the method includes detecting whether a registered marker is present within a digital image or a frame of digital video. In any case, the registered marker is associated with the particular musical instrument on which it was placed and registered.

The method, at step 806 in this example, includes retrieving from memory a set of data associated with an instrument, such as musical instrument. The set of data includes the registered marker location associated with the instrument, as described in step 804. The set of data also includes one or more actuator locations, such as the locations of the keys on a piano or the valves on a trumpet. The set of data, in this example, also includes a set of sounds that can be produced by the musical instrument. The producible sounds may be correlated with one or more notes in a musical composition. In this example, each sound is associated with a set of finger engagements with the actuators. The relationships between actuators, sounds, and finger engagements vary depending on the type of musical instrument. The variety of musical instruments gives rise to the need to create and store a set of data associated with each instrument.

The set of data about a musical instrument includes one or more actuator locations, such as the locations of the keys on a piano. The actuator locations, in some implementations, are expressed in terms relative to an instrument coordinate system. For example, the origin of an instrument coordinate system may be established at the center of the key for middle C. Every other key on the keyboard is associated with a set of instrument coordinates, established and stored in accordance with the known geometry of the instrument. In some modern piano keyboards, for example, the visible portion of each white key is about 23.5 millimeters wide and extends about 140 millimeters from the fallboard. The black keys are in a raised position relative to the white keys, about 13.7 millimeters wide, and extend about 80 millimeters from the fallboard. On a trumpet, the three piston valves are spaced between about 20 and 28 millimeters apart. Each instrument has its own instrument coordinates and set of actuator locations.

The actuator locations, in some implementations, are expressed in terms relative to the marker coordinate system. For example, when a marker location is registered on or near a particular piano key, such as the center of the middle C key, the other actuator locations (i.e., the key locations) can be expressed in marker coordinates.

The set of sounds, as well as the types of finger engagements with the actuators, will vary depending on the type of musical instrument and how it produces sound.

A musical instrument is an object created or adapted to produce musical sounds using one or more actuators. The piano is an example of a chordophone, which is a class of instruments which produce sound by vibrating one or more strings that interact with the body of the instrument. The actuators on a piano are the keys, which are connected to hammers that strike a corresponding string inside the body of the piano. The engagement between the fingers and the actuators, for a piano, involves depressing a piano key from its neutral position to a lower position, sufficient to actuate the hammer and strike the string. A finger engagement with a single key produces a single sound. A set of finger engagements with multiple keys produces a group of sounds, commonly known as a chord. For chordophones, the finger engagement with the strings includes striking the string directly or with a hammer (e.g., the piano, as described), plucking or strumming the string (e.g., a harp, guitar), and rubbing the string with a bow (e.g., a violin, cello). In this aspect, the actuator on certain instruments may be the string itself.

The trumpet is an example of an aerophone, which is a class of instruments which produce sound by vibrating a column of air. The actuators on a trumpet are the piston valves, which vary the pitch of the sound produced. The engagement between the fingers and the actuators, for a trumpet, involves depressing the piston valve from its neutral position to a lower position. The set of finger engagements include using a single finger to depress a single valve, or multiple fingers to depress multiple valves simultaneously. For aerophones, the finger engagement with the actuators includes depressing keys to actuate a valve (e.g., a tuba, a French horn, a trumpet, as described), sliding a valve (e.g., a trombone), depressing keys to cover or uncover an opening (e.g., the woodwinds, such as the clarinet, flute, oboe), and covering or uncovering an opening with the finger itself (e.g., recorders, certain openings on woodwind instruments).

The drum is an example of a membranophone, which is a class of instruments which produces sound by vibrating a stretched membrane. The actuator for a drum may be a drumstick, a mallet, a brush, or one or more fingers of the hand. The engagement between the fingers and the actuators, for a drum, includes moving the actuator to strike the membrane and make a sound.

The xylophone is an example of an idiophone, which is a class of instruments which produce sound by vibrating the primary body of the instrument itself, without the use of strings or membranes. Most percussion instruments that are not drums are classified as idiophones. The actuators for a xylophone may be a stick, a mallet, a hammer, or one or more fingers of the hand. The engagement between the fingers and the actuators, for a xylophone, includes moving the actuator to strike one of the bars and make a sound. A finger engagement with a single bar produces a single sound. A set of finger engagements with multiple bars (by holding multiple mallets, for example) produces a group of sounds, commonly known as a chord. For idiophones, the finger engagement includes striking the instrument with a hammer or mallet (e.g., the xylophone, as described), striking two or more instruments against one another (e.g., cymbals, castanets), rubbing or scraping parts of the instrument (e.g., singing bowls), plucking parts of the instrument (e.g., jaw harp, lamellophone), or shaking the instrument (e.g., rattles, maracas).

Electronic instruments produce sounds in a variety of ways, depending on the user interface. In this context, the user interface serves as the actuator for interacting with the various components (both electronic and non-electronic) that are coupled to the electronic instrument. The engagement between a user and the actuator may include programming, digital or analog instructions, and physical input from a person with any of a variety of objects using the hands or fingers. In this aspect, the set of finger engagements may include entering instructions or programming by pressing keys on a computer keyboard.

The method, at step 808 in this example, includes retrieving from memory a song file 482 that includes a tempo and a sequence of notes and note values. A note is a symbol denoting a particular pitch or other musical sound. The note value includes the duration the note is played, relative to the tempo, and may include other qualities such as loudness, emphasis, articulation, and phrasing relative to other notes. The tempo, in some implementations, includes a default value along with a user interface through which the user may select a particular tempo for use during playback of the song.

A song is a musical composition based on a particular key and written for one or more instruments. Certain musical instruments are constructed to play in a certain key. The clarinet, for example, is sized and shaped to play in the key of B flat. To play a song written in the key of C major, the notes need to be transposed to B flat for the clarinet. Transposing and arranging music for instruments of different keys is common. In this aspect, at step 808, the retrieved song file 482 is correlated with the musical instrument to be played.

The step 808 of retrieving a song file 482, in some implementations, includes initiating playback of the song file 482 almost immediately upon retrieval. The method, in some implementations, includes presenting a user interface through which the user may start playback. Playback of the song file 482, as described in step 812 below, includes presenting a series of virtual tutorial objects on the display. Playback, in some implementations, includes playing one or more audio elements related to the song, such as tempo cues, a voice singing the song lyrics, a musical performance of all or part of the song, and any of a variety of other sounds to provide guidance or tutorial support for the user. These audio elements may be included and stored as part of the song file 482.

The method at step 810 includes the eyewear device 100 determining its local position relative to the marker location, in a process known as localization. According to one example, the marker is detected in the frames of video data and the marker location is retrieved from memory. The eyewear device 100 is preparing to render one or more virtual objects and present it to the user on a display (e.g., one of the lenses of the eyewear device 100). Before the virtual objects can be rendered and presented in an accurate and realistic manner, in this example, one or more of several steps may be completed. In localization, at step 810, the local position of the eyewear device 100 relative to the marker location is determined. The local position of the eyewear device 100 may be expressed in marker coordinates (x, y, z) relative to the marker location on the instrument.

In addition, the method may include constructing a map of the environment 600 (block 708 of FIG. 7) and determining a head pose (block 710), as described herein, both of which help to further orient the position of the eyewear device 100 relative to the mapped environment.

The localization at step 810 is repeated for some or all of the frames of video data captured by the camera because the local position of the eyewear device 100 changes as the wearer moves. Movements of the eyewear device 100 also change the position and orientation from which the camera captures the sequences of frames of video data. In this aspect, the method continually updates the current local position of the eyewear device 100 as the wearer moves relative to the physical environment, so that the virtual objects presented are persistently viewable in a logically authentic location relative to the physical environment and to the musical instrument.

Using the position and orientation results obtained during localization (step 810) and, in some implementations, using a virtual object rendering utility, the eyewear device 100 executes the step 812 of presenting a series of virtual tutorial objects on the display in a size, shape, and orientation that is correlated with the marker location and, in some implementations, also correlated with the user's head pose. The presenting step 812 may include retrieving from memory one or more of the virtual tutorial objects (e.g., stored in a virtual object library or database 484) associated with the musical instrument, which may be part of the set of data about the musical instrument. In some implementations, the display is projected onto one or both lenses of the eyewear device 100, facilitating a view of both the virtual object and the physical environment. For example, the right lens (right optical assembly 180B) includes a right display matrix configured to interact with light from a right projector 150 positioned to project images onto the interior surface of the lens 180B. In this aspect, the virtual tutorial objects are presented as an overlay relative to the physical environment, such that the virtual tutorial objects are persistently viewable.

The presenting step 812, in some implementations, includes correlating the sequence of notes in the song file 482 to the set of sounds produced by the musical instrument, both in terms of the actuator locations on the instrument and the finger engagements associated with each actuator location to produce the desired sound. In this aspect, for example, a first note in the song file 482 is correlated with a first set of finger engagements and a first actuator location, such that a first graphical element appears near the first actuator location and serves as a guide to producing a first sound in accordance with the first note.

During playback of the song file 482, at step 812, the series of virtual tutorial objects includes graphical elements that appear on or near one or more actuator locations, in accordance with the local position of the eyewear device 100 and the progress of the song in time. For example, a graphical element, such as a simple round spot, is presented on the display in a size, shape, and orientation that appears (to the user) to be located on or near the center of a piano key that plays the sound associated with a note in the song file 482; and the element remains visible on the piano key for a duration associated with the note value. In this example, the graphical elements serve as a guide for the instrument player.

The step 812 of presenting a series of virtual tutorial objects, in one example, includes presenting the graphical elements on a virtual scroll that appears (to the user) to be approaching the musical instrument from a distant location and at a speed correlated with the tempo of the song. In this example, the graphical elements provide information about the notes (and note values) to be played in the near future, during the song. The graphical elements, in one example, are shaped like columns on the virtual scroll and are sized in width according to the size and shape of the actuator (e.g., as wide as a piano key) and sized in length according to the note value (and the tempo) (e.g., having a length matching a duration of two whole notes).

In another example, the step 812 of presenting a series of virtual tutorial objects includes presenting one or more graphical elements on the display in a size, shape, and orientation that appears (to the user) to coincide with the user's hand(s). The graphical elements, in this example, may include a mark or dot located near each of the correct fingertip positions (as described herein) or a wireframe model hand (rendered using the correct fingertip positions). In this example, the wireframe model hand serves as a guide for the performer, indicating the location of the correct fingertip positions in relation to the performer's hand(s).

The method, in one example, includes providing one or more additional tutorial signals, correlated with the song file 482 during playback, to guide the user. The eyewear device 100 may include a variety of signal generating components, such as a user-facing lamp (e.g., an LED positioned near the field of view), one or more loudspeakers (e.g., near the ears), and a vibratory motor for generating haptic signals. The method, for example, may include playing a performance of the song file 482 (e.g., vocal, instrumental, or both) at a relatively low volume through the loudspeakers as an additional tutorial signal for the user to follow. The method, in another example, may include providing an additional tutorial signal at intervals correlated with the tempo of the song (like a metronome), by periodically illuminating an LED or activating a vibratory motor. The method may include generating an additional tutorial signal at one or more selected times during playback of a song (e.g., to signal changes in dynamics, tempo, or key). The additional tutorial signals may be included and stored in the song file 482, which is correlated with the sounds producible each particular instrument. The step of retrieving the song file 482 may include selecting one or more of the additional tutorial signals, if any, to be provided during playback.

Figure 9:
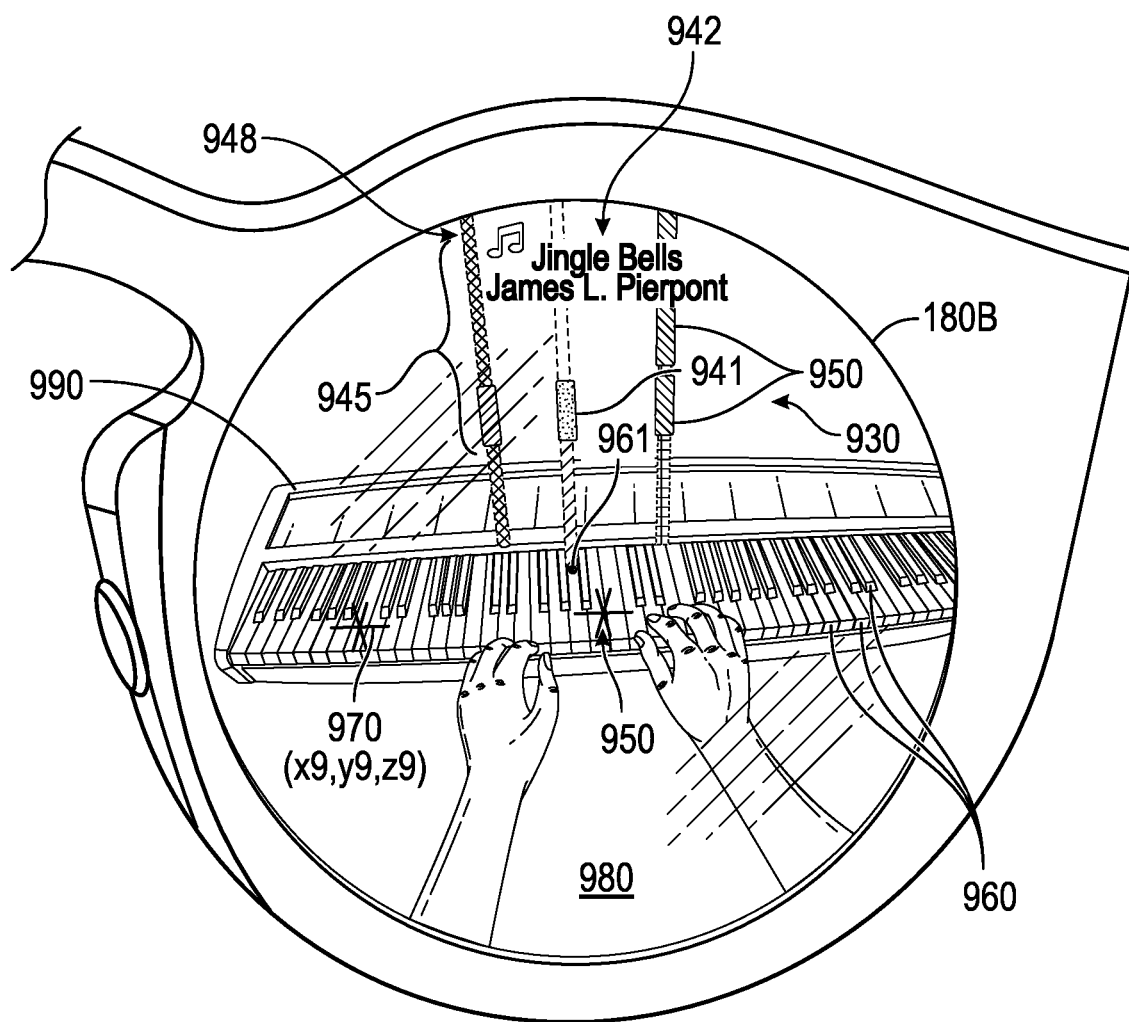
FIG. 9 is a perspective illustration of virtual tutorial objects presented on a display during playback of a song file in augmented reality.

FIG. 9 is a perspective illustration of virtual tutorial objects presented on a display during playback of a song file 482. In this example, a series of virtual tutorial objects 930 is presented on the example display 980 as an overlay relative to the physical environment 600, which includes a musical instrument 990. A virtual marker 950 is located on the musical instrument 990. The marker location, in some implementations, includes a set of three-dimensional marker coordinates. The marker 950 may be stored in the set of data associated with the musical instrument 990 or, alternatively, may be selected and registered by the user through a user interface. The musical instrument 990 includes one or more actuators 960, each of which is associated with an actuator location 970.

In this example, the marker location is near the center of the middle C key on a piano keyboard. Each piano key is one of the actuators 960. The set of data associated with the musical instrument 990 (e.g., the piano) includes the actuator locations 970 (e.g., coordinates (x9, y9, z9) associated with each of the eighty-eight keys), a set of sounds producible by the instrument 990 (e.g., the sound produced by each of the eighty-eight piano strings), and a set of finger engagements (e.g., depressing a key through a downward distance sufficient to produce the sound from the respective string).

The series of virtual tutorial objects 930 may include graphical elements 940 presented on the display 980 at locations that appear to be associated with the actuators 960, in accordance with and during playback of the song file 482. The graphical elements 940 in this example are presented on a virtual scroll 945, which is like a virtual representation of a perforated piano roll used to operate a self-playing piano. The virtual scroll 945 appears to move from a distal location 948 toward the instrument 990 at a speed that is correlated with the tempo from the song file 482. The apparent motion of the graphical elements 940 on the virtual scroll 945, at tempo, provides information about the upcoming notes of the song—and the actuator associated with each note—thereby providing a series of anticipatory visual cues to the player. Each graphical element 950 is correlated with one (or several) actuators 960, according to the notes in the song file 482 and the sounds producible by the instrument. In the example illustrated, a first graphical element 941 appears to move toward a first actuator 961; the first note in the song file 482 is correlated with the sound produced when the player executes a finger engagement with the first actuator 961 (e.g., depressing the key). The first graphical element 941 is sized in width to generally match the width of the first actuator 961; and sized in length according to the first note value (i.e., the duration during which the note should be played). During playback, when the first graphical element 941 appears to coincide with the first actuator 961, the player should engage with the first actuator 961 and continue such engagement until the first graphical element 941 ends or disappears. As shown, the first graphical element 941 includes multiple segments, lengthwise, which start and stop in accordance with the song file 482.

As shown in FIG. 9, the series of virtual tutorial objects 930, in some implementations, includes graphical elements 940 that appear in a distant location relative to the actuator locations 970 on the instrument 990. In the example shown, a second graphical element 942 includes symbols (e.g., a pair of musical notes) and text (e.g., the song title and author). The second graphical elements 942 may include any of a variety of information or indicia, some of which may be stored in the song file 482. While the second graphical elements 942 are not presented on or near the actuators 960, they are displayed in locations relative to the actuator locations 970, in accordance with the local position of the eyewear device 100, and in accordance with the progress of the song.

The example display 980 is semi-transparent, facilitating a view of both the series of virtual tutorial objects 930 and the physical environment 600. The eyewear device 100, as described herein, may include a right projector 150 positioned to present images onto the interior surface of the right lens 180B (i.e., the right optical assembly 180B) which includes a right display matrix configured to interact with light from the projector 150. In this configuration, the series of virtual tutorial objects 930 are presented as an overlay relative to the physical environment 600, such that both are persistently viewable.

Figure 10:
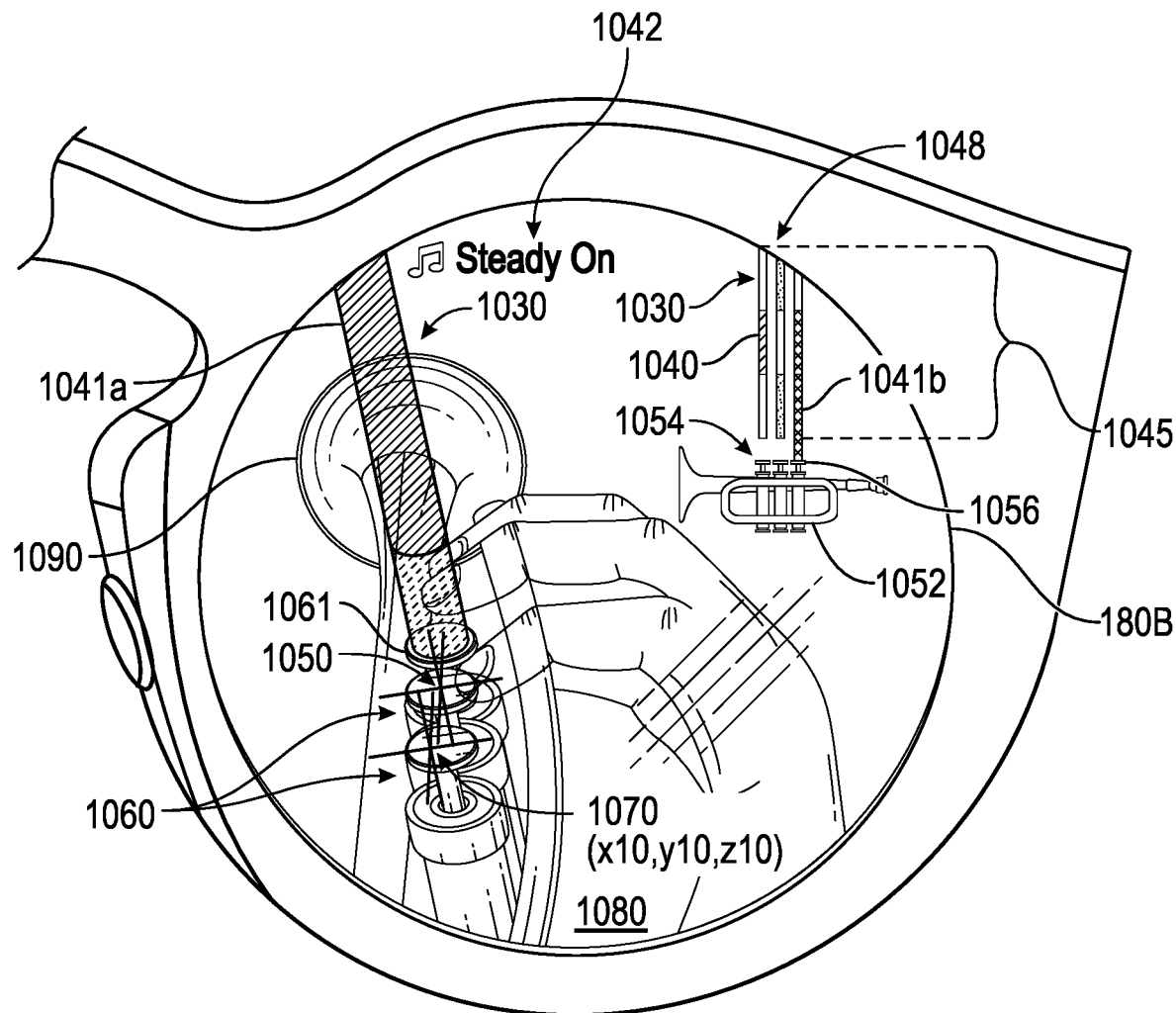
FIG. 10 is a perspective illustration of virtual tutorial objects, including a pictogram, presented on a display during playback of a song file in augmented reality.

FIG. 10 is a perspective illustration of virtual tutorial objects, including a pictogram, presented on a display during playback of a song file 482. In this example, the series of virtual tutorial objects 1030 are presented on the example display 1080 as an overlay relative to the physical environment 600, which includes a musical instrument 1090. A virtual marker 1050 is located on the musical instrument 1090. The marker location, in some implementations, includes a set of three-dimensional marker coordinates. The marker 1050 may be stored in the set of data associated with the musical instrument 1090 or, alternatively, may be selected and registered by the user through a user interface. The musical instrument 1090 includes one or more actuators 1060, each of which is associated with an actuator location 1070.

Some musical instruments are at least partially obstructed from view while being played. The valves on a trumpet, for example, are partially obstructed and difficult to see through a display. The method, in some implementations, includes presenting a pictogram 1052 of the musical instrument 1090 on the display 1080, which serves as a graphical substitute for the actual instrument. A pictogram is an illustration that conveys its meaning through its pictorial resemblance to a physical object. The pictogram 1052, as shown, includes a plurality of simulated actuator locations 1054 which are sized and shaped to mimic the actual actuators. The pictogram 1052 of the trumpet, in this example, includes an illustration of three simulated actuators 1054 (i.e., the three piston valves on the trumpet). When a pictogram 1052 is present, the graphical elements 1040 approach the simulated actuators 1054 or the actual actuators 1060—or both (as shown). The pictogram 1052, as shown, is presented on the display in a generally consistent location relative to the display 1080. In this aspect, the tutorial is persistently viewable to the user when performing, even in circumstances when the actual instrument 1090 is partially or totally obscured from view.

In this example, the marker location is near the center of the middle piston valve on a trumpet. Each valve is an actuator 1060, associated with an actuator location 1070, which may be expressed in marker coordinates. The set of data associated with the musical instrument 1090 (e.g., the trumpet) includes the actuator locations 1070 (e.g., coordinates (x10, y10, z10) associated with each of the three valves), a set of sounds producible by the instrument 1090 (e.g., the sound produced by the valves, alone or in combination, together with the player's embouchure), and a set of finger engagements (e.g., depressing a valve through a downward distance sufficient to produce the associated sound).

The series of virtual tutorial objects 1030 include graphical elements 1040 presented on the display 1080 at locations that appear to be associated with the actuators 1060, in accordance with and during playback of the song file 482. The graphical elements 1040 in this example are presented on a virtual scroll 1045 that appears to move from a distal location 1048 toward the instrument 1090 (or toward the pictogram 1052) at a speed that is correlated with the tempo from the song file 482. The apparent motion of the graphical elements 1040 on the virtual scroll 1045, at tempo, provides information about the upcoming notes of the song—and the actuator associated with each note—thereby providing a series of anticipatory visual cues to the player. Each graphical element 1040 is correlated with one (or several) actuators 1060, according to the notes in the song file 482 and the sounds producible by the instrument. In the example illustrated, a first graphical element 1041a appears to move toward a first actuator 1061 (on the trumpet 1090)—and a supplemental graphical element 1041b appears to move toward a first simulated actuator 1056 (on the pictogram 1052). The first note in the song file 482 is correlated with the sound produced when the player executes a finger engagement with the first actuator 1061 (e.g., depressing the valve and adjusting the embouchure). The first graphical element 1041a is sized in width to generally match the width of the first actuator 1061 (and the supplemental graphical element 1041b is sized to generally match the width of the first simulated actuator 1056); and sized in length according to the first note value (i.e., the duration during which the note should be played). During playback, when the first graphical element 1041a appears to coincide with the first actuator 1061 (or the first simulated actuator 1061), the player should engage with the first actuator 1061 and continue such engagement until the first graphical element 1041a ends or disappears. As shown, the first graphical element 1041a includes multiple segments, lengthwise, which start and stop in accordance with the song file 482.

As shown in FIG. 10, the series of virtual tutorial objects 1030, in some implementations, includes graphical elements 1040 that appear in a distant location relative to the actuator locations 1070 on the instrument 1090. In the example shown, a second graphical element 1042 includes symbols (e.g., a pair of musical notes) and text (e.g., the song title). The second graphical elements 1042 may include any of a variety of information or indicia, some of which may be stored in the song file 482. While second graphical elements 1042 are not presented on or near the actuators 1060, they are displayed in locations relative to the actuator locations 1070, in accordance with the local position of the eyewear device 100, and in accordance with the progress of the song.

The example display 1080 is semi-transparent, facilitating a view of both the series of virtual tutorial objects 1030 and the physical environment 600. The eyewear device 100, as described herein, may include a right projector 150 positioned to present images onto the interior surface of the right lens 180B (i.e., the right optical assembly 180B) which includes a right display matrix configured to interact with light from the projector 150. In this configuration, the series of virtual tutorial objects 1030 are presented as an overlay relative to the physical environment 600, such that both are persistently viewable.

Figure 11:
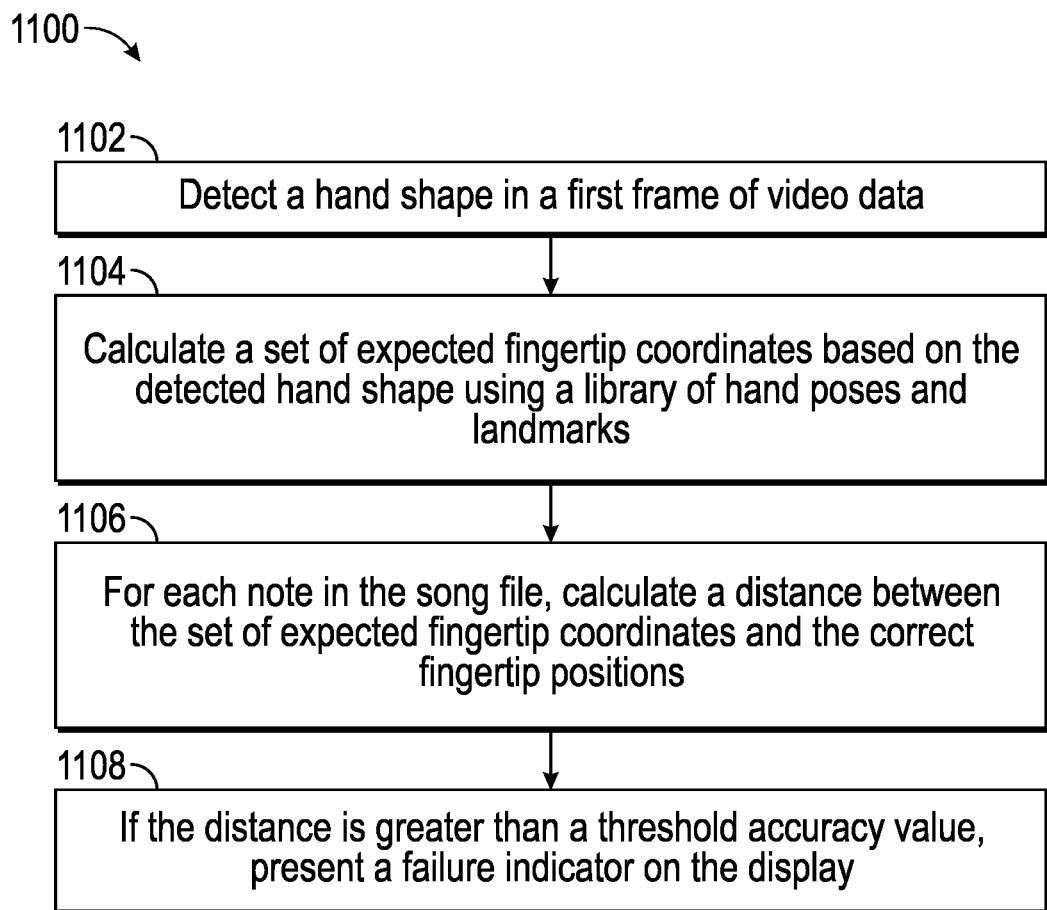
FIG. 11 is a flow chart listing steps in an example method of detecting and tracking the hands and fingers, suitable for use in conjunction with the example method of FIG. 8.

FIG. 11 is a flow chart 1100 listing steps in an example method of detecting and tracking the hands and fingers, in conjunction with presenting a tutorial in augmented reality. The method of presenting a tutorial, at step 802 (in FIG. 8) includes capturing sequences of frames of video data with a camera 114A, 114B that is coupled to or part of an eyewear device 100. Each frame of digital video includes three-dimensional depth information for a plurality of pixels.

The method, at step 1102, includes detecting a hand shape in a frame of video data. The process of detecting includes analyzing the depth information in the frame to determine if a hand shape is present using, for example, a hand tracking utility 925 as described herein. The detecting step, in some implementations, includes running a palm detector algorithm to determine if a palm shape is present in the frame. The palm shape can be detected in images that include the palmar side of the hand or the opposing dorsal side (i.e., the back of the hand). The palm shape, alone, is easier to detect compared to the task of detecting an entire hand including the fingers. Moreover, the palm shape can be modeled using a simple polygon, such as a rectangle or even a triangle. The palm shape serves as an anchor for the rest of the hand. If no palm shape is detected, the step is repeated for a subsequent frame of video data.

Real-time hand perception and tracking using computer vision is a complex task that requires a substantial amount of image processing. Hands are not uniform in size or precisely the same in shape. Parts of the hand are often obstructed from view, making the hand and its landmarks difficult to detect in a single image frame.

The palm detector, in some implementations, returns a cropped image that includes the palm shape plus an additional area around the palm shape which may include the rest of the hand. Analyzing the cropped image requires less memory and processing compared to analyzing the entire frame.

The method, at step 1104, includes calculating a set of expected fingertip coordinates based on the detected hand shape. The set includes three-dimensional coordinates for the location of one or more of the five fingertips. The origin of the fingertip coordinates may be set at a location on the detected hand shape or on the palm shape, or at a location on the boundary of the cropped image. The fingertip coordinates are described as expected because they represent the locations where the fingertips are expected to be found, when starting with the detected hand shape.

This step 1104, in some implementations, includes selecting a candidate hand shape from a library 486 of hand poses and landmarks. The hand landmark library 486 includes three-dimensional coordinates for a large number of landmarks, from the wrist to the fingertips—and for hands in many different poses and orientations. For example, a hand shape record stored in the library 486 may include a hand pose (e.g., open, relaxed, closed fist, grasping an object, making a gesture), a point of view or directional reference (e.g., palmar side visible, dorsal, lateral), and other information about orientation, along with three-dimensional coordinates for the wrist, the fifteen interphalangeal joints, the five fingertips and other skeletal or soft-tissue landmarks. Accordingly, the process of selecting a candidate hand shape from the library 486 involves comparing the detected hand shape to each hand shape in the library 486 until a good match is found.

The selected candidate hand shape includes a candidate set of fingertip coordinates. If the correlation is strong between the selected candidate hand shape and the detected hand shape in the image frame, then the candidate set of fingertip coordinates may be used as the set of expected fingertip coordinates.

A strong correlation is not always possible, especially given the infinite variety of hand poses and the finite store of hand shape records stored in the library 486. Accordingly, in some implementations, this step includes calculating a confidence value representing the relative strength of the correlation and, if the value is low, selecting a subsequent candidate.

Using the detected hand shape in the image frame, the method includes estimating an image set of fingertip coordinates that are based on the depth information in the frame of video data. The image set of fingertip coordinates may be estimated using x and y values from the 2D image frame, together with z values from the depth information.

The confidence value may be calculated by measuring the geodesic distance (i.e., the shortest possible line between two points in three-dimensional space) between each of the five fingertip coordinates in the candidate set to those in the image set. The confidence value is the total of all five distances. If the confidence value is greater than a minimum confidence value, then a different, subsequent hand shape is selected from the library to serve as the candidate hand shape, and the calculating step 1104 is repeated.

The method, in some implementations, uses the set of expected fingertip coordinates calculated in step 1104 to render and present on the display a wireframe hand skeleton, in accordance with the local position of the eyewear device, such that the wireframe hand skeleton is presented on the display in a size, shape, and orientation that appears (to the user) to coincide with the user's hand.

The method, at step 1106, involves judging the skill of the user when performing a song with a musical instrument. A song file 482 includes sequences of notes, note values, and a tempo. A set of data about a musical instrument includes the marker location, a plurality of actuator locations, and a set of producible sounds. Each sound is associated with a set of finger engagements with one or more of the actuators at the actuator locations. For example, a finger engagement in the form of depressing a piano key (i.e., an actuator) from its neutral position to a lower position, with sufficient force to actuate the hammer and strike the string, produces the sound associated with that piano key. When a person performs a musical composition, the fingers are engaged with the actuators to produce sounds that correlate with the notes of the composition.

The method, at step 1106, involves comparing the set of expected fingertip coordinates in the image (calculated in step 1104) to a set of correct fingertip positions for each note of the song. For each instrument, the set of finger engagements with actuators to produce an expected sound includes a set of correct fingertip positions. For a piano to produce a single sound associated with middle C, for example, the set of correct fingertip positions may include a thumb fingertip located at the depressed position of the middle C key, with the other fingertips located at neutral positions relative to the keys. Note that the correct fingertip position may be actively interacting with the actuator (e.g., depressing the piano key) or neutral with respect to the actuator (e.g., not depressing the key, located elsewhere in any neutral position). Both such positions are described herein as finger engagements.

The comparison step 1106 includes calculating, for each note of a song, during playback, a sum of the geodesic distances between the set of expected fingertip coordinates in the image (calculated in step 1104, using an image captured at a time corresponding to the note) to the set of correct fingertip positions (for playing the sound correlated with the note, as stored in the set of data for this musical instrument). If the sum is less than a threshold accuracy value, that indicates the expected fingertip coordinates in the image are sufficiently close to the correct fingertip positions. In response, the method at step 1108 may include presenting a success indicator on the display, such as a green mark, indicating to the performer that the fingertip positions are correct for this note. The success failure may persist as long as the fingertip positions are correct for the sequence of notes in the song.

If the sum is greater than a threshold accuracy value, that indicates the expected fingertip coordinates in the image are too far away from the correct fingertip positions. In response, the method at step 1108 includes presenting a failure indicator on the display. The failure indicator may take any of a variety of forms and may be presented on the display at any apparent location. For example, a failure indicator in the form of a red X may be presented on the display in a size, shape, and orientation that appears (to the user) to be located on or near the incorrect actuator (i.e., the actuator associated with the incorrect fingertip position). The failure indicator may remain visible for a duration associated with the note value associated with the incorrect note. When a pictogram is present on the display, as in FIG. 10, the failure indicator may be presented near the simulated actuator location where the error occurred. In this example, the failure element serves as a guide for the performer, indicating an error was made for this note of the song.

The comparison, at step 1106, including the potential presenting of a failure indicator on the display, may be performed in conjunction with the presenting of a series of virtual tutorial objects, at step 812, during playback. In this example, the series of virtual tutorial objects serve to guide the performer toward placing the fingertips at the correct fingertip positions, while the failure indicators (if any) provide notice to the performer when the fingertips positions are incorrect.

The method, in some implementations, includes displaying a corrective element in addition to or instead of the failure element. The corrective indicator may take any of a variety of forms and may be presented on the display at any apparent location. For example, a corrective indicator in the form of a blue check mark may be presented on the display in a size, shape, and orientation that appears (to the user) to be located on or near the correct actuator (i.e., the actuator that would have been engaged if the performer had used the correct fingertip position). In this example, the corrective element serves as a guide for the performer, indicating the note that should have been played.

The augmented reality tutorial system 400, in some implementations, includes an eyewear device 100 having one or more cameras 114A, 114B, a processor 432, a memory 434, and one or more display elements 180A, 180B. Programming stored in memory includes a marker registration utility 910 for setting and storing markers, a localization utility 915 for locating the eyewear device 100 relative to a marker location and to the mapped environment, a virtual object rendering utility 920 for presenting on the display one or more virtual objects having a desired size, shape, and orientation, and a hand tracking utility 925 for detecting and tracking the hands and fingers. Execution of the programming configures the eyewear device 100 to perform the steps described herein, such as those in the flow chart 800 (FIG. 8) and in the flow chart 1100 (FIG. 11).

The marker registration utility 910, in some implementations, is used to select and register one or more markers and marker locations relative to one or more landmarks in a physical environment. The marker registration utility 910, in some implementations, includes a user interface through which the user can select the marker location while viewing the physical environment. For example, a user viewing a musical instrument can use a cursor or other pointing device to place a marker on or near one of the actuators on the instrument, such as the middle C key on a piano. For each marker placed, the marker registration utility 910 stores in memory a marker location that may be expressed in terms of a set of three-dimensional marker coordinates. The marker coordinates may be associated with or correlated with depth information obtained from a digital image or a frame of digital video.

The localization utility 915 locates the position of the eyewear device 100 relative to one or more nearby marker locations, and relative to the mapped environment, as described herein. The localization utility 915 may be selectively executed at a first marker location and at any of a plurality of subsequent marker locations to obtain an accurate eyewear location.

The virtual object rendering utility 920 prepares the virtual objects for display based on the eyewear location, the head pose of the wearer, and the location of one or more physical object landmarks in the physical environment, such as a musical instrument, as described herein. The virtual object rendering utility 920, in some implementations, renders and presents the virtual object automatically when the eyewear device 100 begins playback of a song file 482.

The hand tracking utility 925 detects a hand shape in one or more frames of video data, using three-dimensional depth information captured by the camera. The hand tracking utility 925 calculates a set of expected fingertip coordinates, as described herein, and compares them to the correct fingertip positions associated with a particular sound. The hand tracking utility 925 in some implementations selects a candidate hand shape from a library 486 of hand poses and landmarks, using the detected hand shape as a guide.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™ ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure.

This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of presenting a tutorial using an eyewear device, the eyewear device comprising a processor, a memory, a camera, and a display, the method comprising the steps of:
    capturing frames of video data with the camera;
    registering, using the processor, a marker location associated with a musical instrument in a physical environment;
    estimating a local position of the eyewear device relative to the marker location based on the frames of video data;
    retrieving from the memory a song file associated with the musical instrument, wherein the song file comprises a tempo, a sequence of notes and note values, and a series of virtual tutorial objects;
    presenting on the display, based on the local position, the series of virtual tutorial objects relative to the marker location in accordance with the song file;
    retrieving from the memory a set of sounds associated with the musical instrument, wherein each sound is associated with a set of finger engagements with one or more of a plurality of actuator locations, wherein the set of finger engagements comprises correct fingertip positions, and wherein each correct fingertip position is associated with an expected sound selected from the set of sounds;
    correlating the sequence of notes in the song file with the set of finger engagements, such that a first note is correlated with a first correct fingertip position to produce a first expected sound;
    detecting a hand shape in a first frame of the frames of video data, wherein the first frame includes first depth information for a first plurality of pixels;
    calculating a set of expected fingertip coordinates based on the hand shape;
    for each note in the sequence of notes in the song file, calculating a sum of the geodesic distances between the set of expected fingertip coordinates and the correct fingertip positions; and
    in response to determining that the sum is greater than a threshold accuracy value, presenting a failure indicator on the display.

2. The method of claim 1, wherein the step of calculating the set of expected fingertip coordinates further comprises:
    selecting a candidate hand shape from a library of hand poses and landmarks based on the detected hand shape, wherein the candidate hand shape comprises a candidate set of fingertip coordinates;
    estimating an image set of fingertip coordinates based on the first depth information in the first frame of video data;
    calculating a confidence value represented by a total of the geodesic distances between the candidate set of fingertip coordinates and the image set of fingertip coordinates; and
    in response to determining that the confidence value is greater than a minimum confidence value, selecting a subsequent candidate hand shape from the library.

3. The method of claim 1, wherein the step of presenting the series of virtual tutorial objects further comprises:
    correlating the set of sounds with the sequence of notes in the song file,
    wherein a first sound is correlated with a first note and a first set of finger engagements with a first actuator location, such that a first graphical element appears near the first actuator location as guide to producing the first sound in accordance with the first note.

4. The method of claim 3, wherein the step of presenting the series of virtual tutorial objects further comprises:
    presenting the first graphical element on a virtual scroll that appears to move from a distal location toward the marker location at a speed correlated with the tempo, wherein the first graphical element representing the first note is sized in length according to a first note value, and such that the first graphical element appears near the first actuator location for a duration correlated with the first note value.

5. The method of claim 3, wherein the step of presenting the series of virtual tutorial objects further comprises:
    presenting a pictogram resembling the musical instrument and comprising a plurality of simulated actuator locations, each correlated with a respective one of the plurality of actuator locations; and
    presenting the first graphical element near one or more of the simulated actuator locations in accordance with the song file.

6. The method of claim 3, wherein the step of presenting the series of virtual tutorial objects further comprises:
    presenting a wireframe hand skeleton on the display at a location correlated with the detected hand shape and in accordance with the local position of the eyewear device, wherein the wireframe hand skeleton is based on the set of expected fingertip coordinates.

7. A system for presenting a tutorial using an eyewear device, the eyewear device comprising a processor, a memory, a camera, and a display, the system comprising:
    programming in the memory, wherein execution of the programming by the processor configures the eyewear device to perform functions, including functions to:
    capture frames of video data with the camera;
    register a marker location associated with a musical instrument in a physical environment;
    estimate a local position of the eyewear device relative to the marker location based on the frames of video data;
    retrieve from the memory a song file associated with the musical instrument, wherein the song file comprises a tempo, a sequence of notes and note values, and a series of virtual tutorial objects;
    present on the display, based on the local position, the series of virtual tutorial objects relative to the marker location in accordance with the song file;
    retrieve from the memory a set of sounds associated with the musical instrument, wherein each sound is associated with a set of finger engagements with one or more of a plurality of actuator locations, wherein the set of finger engagements comprises correct fingertip positions, and wherein each correct fingertip position is associated with an expected sound selected from the set of sounds;
correlate the sequence of notes in the song file with the set of finger engagements, such that a first note is correlated with a first correct fingertip position to produce a first expected sound;
detect a hand shape in a first frame of the frames of video data, wherein the first frame includes first depth information for a first plurality of pixels;
calculate a set of expected fingertip coordinates based on the hand shape;
for each note in the sequence of notes in the song file, calculate a sum of the geodesic distances between the set of expected fingertip coordinates and the correct fingertip positions; and
in response to determining that the sum is greater than a threshold accuracy value, present a failure indicator on the display.

8. The system of claim 7, wherein the function to calculate the set of expected fingertip coordinates further comprises functions to:
select a candidate hand shape from a library of hand poses and landmarks based on the detected hand shape, wherein the candidate hand shape comprises a candidate set of fingertip coordinates;
estimate an image set of fingertip coordinates based on the first depth information in the first frame of video data;
calculate a confidence value represented by a total of the geodesic distances between the candidate set of fingertip coordinates and the image set of fingertip coordinates; and
in response to determining that the confidence value is greater than a minimum confidence value, select a subsequent candidate hand shape from the library.

9. The system of claim 7, wherein the function to present the series of virtual tutorial objects further comprises functions to:
correlate the set of sounds with the sequence of notes in the song file,
wherein a first sound is correlated with a first note and a first set of finger engagements with a first actuator location, such that a first graphical element appears near the first actuator location as guide to producing the first sound in accordance with the first note.

10. The system of claim 9, wherein the function to present the series of virtual tutorial objects further comprises functions to:
present the first graphical element on a virtual scroll that appears to move from a distal location toward the marker location at a speed correlated with the tempo, wherein the first graphical element representing the first note is sized in length according to a first note value, and such that the first graphical element appears near the first actuator location for a duration correlated with the first note value.

11. The system of claim 9, wherein the function to present the series of virtual tutorial objects further comprises functions to:
present a pictogram resembling the musical instrument and comprising a plurality of simulated actuator locations, each correlated with a respective one of the plurality of actuator locations; and
present the first graphical element near one or more of the simulated actuator locations in accordance with the song file.

12. The system of claim 9, wherein the function to present the series of virtual tutorial objects further comprises functions to:
present a wireframe hand skeleton on the display at a location correlated with the detected hand shape and in accordance with the local position of the eyewear device, wherein the wireframe hand skeleton is based on the set of expected fingertip coordinates.

13. A non-transitory computer-readable medium storing program code that, when executed, is operative to cause a processor of an eyewear device to perform the steps of:
capturing frames of video data with a camera coupled to the eyewear device, the eyewear device further comprising a memory and a display;
registering a marker location associated with a musical instrument in a physical environment;
estimating a local position of the eyewear device relative to the marker location based on the frames of video data;
retrieving from the memory a song file associated with the musical instrument, wherein the song file comprises a tempo, a sequence of notes and note values, and a series of virtual tutorial objects;
presenting on the display, based on the local position, the series of virtual tutorial objects relative to the marker location in accordance with the song file;
retrieving from the memory a set of sounds associated with the musical instrument, wherein each sound is associated with a set of finger engagements with one or more of a plurality of actuator locations, wherein the set of finger engagements comprises correct fingertip positions, and wherein each correct fingertip position is associated with an expected sound selected from the set of sounds;
correlating the sequence of notes in the song file with the set of finger engagements, such that a first note is correlated with a first correct fingertip position to produce a first expected sound;
detecting a hand shape in a first frame of the frames of video data, wherein the first frame includes first depth information for a first plurality of pixels;
calculating a set of expected fingertip coordinates based on the hand shape;
for each note in the sequence of notes in the song file, calculating a sum of the geodesic distances between the set of expected fingertip coordinates and the correct fingertip positions; and
in response to determining that the sum is greater than a threshold accuracy value, presenting a failure indicator on the display.

14. The non-transitory computer-readable medium storing program code of claim 13, wherein the program code when executed is operative to cause the processor to perform the further steps of:
selecting a candidate hand shape from a library of hand poses and landmarks based on the detected hand shape, wherein the candidate hand shape comprises a candidate set of fingertip coordinates;
estimating an image set of fingertip coordinates based on the first depth information in the first frame of video data;
calculating a confidence value represented by a total of the geodesic distances between the candidate set of fingertip coordinates and the image set of fingertip coordinates; and in response to determining that the confidence value is greater than a minimum confidence value, selecting a subsequent candidate hand shape from the library.

15. The non-transitory computer-readable medium storing program code of claim 13, wherein the program code when executed is operative to cause the processor to perform the further steps of:
- correlating the set of sounds with the sequence of notes in the song file, wherein a first sound is correlated with a first note and a first set of finger engagements with a first actuator location, such that a first graphical element appears near the first actuator location as guide to producing the first sound in accordance with the first note;
- presenting the first graphical element on a virtual scroll that appears to move from a distal location toward the marker location at a speed correlated with the tempo, wherein the first graphical element representing the first note is sized in length according to a first note value, and such that the first graphical element appears near the first actuator location for a duration correlated with the first note value;
- presenting a pictogram resembling the musical instrument and comprising a plurality of simulated actuator locations, each correlated with a respective one of the plurality of actuator locations; and
- presenting the first graphical element near one or more of the simulated actuator locations in accordance with the song file.

* * * * *